US011037215B2

(12) United States Patent
Fagan

(10) Patent No.: US 11,037,215 B2
(45) Date of Patent: *Jun. 15, 2021

(54) QUOTATION MACHINE AND SYSTEM, AND PRODUCTION SYSTEMS ESTIMATING COST FOR, AND FULFILLING, ORDERS FOR NON-EXISTING STEEL PARTS

(71) Applicant: Matthew Fagan, Middle Park (AU)

(72) Inventor: Matthew Fagan, Middle Park (AU)

( * ) Notice: Subject to any disclaimer, the term of this patent is extended or adjusted under 35 U.S.C. 154(b) by 0 days.

This patent is subject to a terminal disclaimer.

(21) Appl. No.: 16/799,284

(22) Filed: Feb. 24, 2020

(65) Prior Publication Data

US 2020/0193497 A1 Jun. 18, 2020

Related U.S. Application Data

(63) Continuation of application No. 15/886,750, filed on Feb. 1, 2018, now Pat. No. 10,614,497.

(60) Provisional application No. 62/503,637, filed on May 9, 2017.

(51) Int. Cl.
*G06Q 30/06* (2012.01)
*G06Q 50/04* (2012.01)

(52) U.S. Cl.
CPC ..... *G06Q 30/0611* (2013.01); *G06Q 30/0603* (2013.01); *G06Q 30/0621* (2013.01); *G06Q 30/0641* (2013.01); *G06Q 50/04* (2013.01); *Y02P 90/30* (2015.11)

(58) Field of Classification Search
CPC ........... G06Q 30/0611; G06Q 30/0621; G06Q 50/04; G06Q 30/0603; G06Q 30/0641; Y02P 90/30; Y02P 90/02
See application file for complete search history.

(56) References Cited

U.S. PATENT DOCUMENTS 5,243,530 A * 9/1993 Stanifer ................ G01C 21/00
340/990
2002/0107723 A1 8/2002 Benjamin et al.
(Continued)

FOREIGN PATENT DOCUMENTS

WO WO 01/77781 A2 10/2001

OTHER PUBLICATIONS

International Search Report and Written Opinion of PCT/IB2018/050645 dated Mar. 5, 2018, 11 pages.
PCT/IB2018/050645 International Preliminary Report on Patentability (Chapter II) dated Sep. 5, 2019, 53 pages.
FastCUT Optimizer <URL:https://web.archive.org/web/20160521002718/http://www.fastcam.com:80/fastcut.html> published on May 21, 2016 as per Wayback Machine, 2 pages.
(Continued)

*Primary Examiner* — Thomas C Lee
*Assistant Examiner* — Anzuman Sharmin
(74) *Attorney, Agent, or Firm* — Lathrop GPM LLP

(57) ABSTRACT

Systems, methods, and software products estimate cost of fulfilling an order for non-existing steel parts. A web site interacts with a customer to receive a request for quote containing a single MTO file defining the non-existing steel parts. The single MTO file is processed to generate at least one layout based upon stock information of a raw steel product. The layout defines (a) nesting of the non-existing steel parts on the raw steel product, (b) a cost of cutting the parts from the raw steel product, (c) a used portion of the raw steel product, (d) a waste portion of the raw steel product, and (e) a remaining usable portion of the raw steel product. A quote estimating the cost of fulfilling the order is generated based upon the at least one layout, and the quote is sent to the customer.

5 Claims, 15 Drawing Sheets

(56) References Cited

U.S. PATENT DOCUMENTS

| | | | |
|---|---|---|---|
| 2002/0178065 A1* | 11/2002 | Des Champs | G06Q 30/0613 705/22 |
| 2003/0126038 A1 | 7/2003 | Lukis et al. | |
| 2005/0125092 A1 | 7/2005 | Lukis et al. | |
| 2005/0172764 A1* | 8/2005 | Fagan | B23K 7/105 83/13 |
| 2006/0142883 A1* | 6/2006 | Ozasa | G06Q 10/04 700/97 |
| 2006/0253214 A1 | 11/2006 | Gross | |
| 2007/0038531 A1 | 2/2007 | Lukis et al. | |
| 2007/0203858 A1* | 8/2007 | Olsen | G06Q 20/02 705/400 |
| 2008/0269942 A1* | 10/2008 | Free | G06F 30/00 700/182 |
| 2012/0017084 A1 | 1/2012 | Hutton | |
| 2014/0236339 A1* | 8/2014 | Fagan | B23K 10/00 700/160 |
| 2015/0066184 A1* | 3/2015 | Bradford | G06Q 10/04 700/106 |
| 2015/0127480 A1* | 5/2015 | Herrman | G06Q 30/0283 705/26.4 |
| 2015/0153724 A1 | 6/2015 | Platt | |
| 2016/0132948 A1 | 5/2016 | Saveliev | |
| 2016/0274572 A1 | 9/2016 | Littrell et al. | |
| 2018/0260827 A1 | 9/2018 | Sullivan et al. | |

OTHER PUBLICATIONS

FastCAM Software Series, FastNEST Reference Manual URL:https://web.archive.org/web/20161020191426/http://fastcam.com:80/download/Manual/FastNEST_ENGLISH.pdf published on Oct. 20, 2016 as per Wayback Machine, 143 pages.

FastCUT Optimizer <URL:https://web.archive.org/web/20170311211916/http://fastcam.com/pdf/FastCUT.pdf> published on Mar. 11, 2017 as per Wayback Machine, 2 pages.

FastCUT Reports details <URL:https://web.archive.org/web/20170311085909/http://www.fastcam.com- /pdf/FastCUTResults.pdf> published on Mar. 11, 2017 as per Wayback Machine, 3 pages.

U.S. Appl. No. 15/886,750 Office Action dated Feb. 15, 2019, 30 pages.

U.S. Appl. No. 15/886,750 Office Action dated Apr. 18, 2019, 20 pages.

U.S. Appl. No. 15/886,750 Office Action dated Aug. 15, 2019, 16 pages.

U.S. Appl. No. 15/886,750 Notice of Allowance dated Nov. 25, 2019, 5 pages.

Australian Patent Application No. 2018266853 Examination Reported dated Jan. 8, 2020, 5 pages.

European Patent Application No. 18798066.9 Extended Search and Opinion dated Sep. 23, 2020, 13 pages.

\* cited by examiner

QUOTATION MACHINE AND SYSTEM, AND PRODUCTION SYSTEMS ESTIMATING COST FOR, AND FULFILLING, ORDERS FOR NON-EXISTING STEEL PARTS

RELATED APPLICATIONS

This application is a continuation of U.S. patent application Ser. No. 15/886,750 filed Feb. 1, 2018, which claims priority to U.S. Patent Application Ser. No. 62/503,637, filed May 9, 2017, and titled "Systems and Methods for Estimating Cost to Fulfill an Order for Non-Existing Steel Parts". Each of the aforementioned applications is incorporated herein by reference.

BACKGROUND

Steel starts as a continuous commodity, not a fixed shelf or retail commodity, perhaps in long extruded sections of arbitrary length useful for beams and pipes and other profile shapes, or as rectangular sheets, rolls and plates for flat product that may be of standard but ultimately arbitrary widths and lengths. Other secondary forms such as metal fabrics like walkway grating and expanded metal and mesh such as concrete reinforcing may also be produced. Other steel products include railway rails, and rod and merchant bar for machining.

In the 1970s, few steel wholesalers did much processing, and their salesmen sold steel based on estimated weight. Even now there are tables showing salesman how to calculate weight by length, then width, then thickness and by alloy content of the material.

Now nearly 90% of the sales volume of a Steel Service Center or steel wholesaler involves at least some steel processing such as cutting the steel into particular shapes desired by a customer; this processing requires labor as well as use of machinery. The remaining 10% of sales are for fixed lengths or standard sized plates or sheets, amenable to using simple costing and sales, and more akin to retail stores with fixed shelf prices.

SUMMARY

In one embodiment, a system estimates cost and optionally fulfills an order for non-existing steel parts. The system includes a computer server that has a processor and memory storing machine readable instructions that are executed by the processor to implement: a customer interface for receiving a single MTO file from a customer, and a quote engine for processing the single MTO file to generate (a) at least one layout of the non-existing steel parts on a raw product based upon the single MTO file, (b) a quote estimating the cost of fulfilling the order based upon the at least one layout, and (c) at least one manufacturing file based upon the at least one layout. The system also includes a steel processing machine for using the at least one manufacturing file to produce the non-existing steel parts from the raw product.

In another embodiment, a method estimates cost of fulfilling an order for non-existing steel parts. A web site interacts with a customer to receive a request for quote containing a single MTO file defining the non-existing steel parts. The single MTO file is processed to generate at least one layout based upon stock information of a raw steel product. The layout defines (a) nesting of the non-existing steel parts on the raw steel product, (b) a cost of cutting the parts from the raw steel product, (c) a used portion of the raw steel product, (d) a waste portion of the raw steel product, and (e) a remaining usable portion of the raw steel product. A quote estimating the cost of fulfilling the order is generated based upon the at least one layout, and the quote is sent to the customer.

In another embodiment, a method estimates cost to fulfill an order for non-existing steel parts. A request for quote (RFQ) containing a single manual take-off (MTO) file is received from a customer. The single MTO file is processed to determine the non-existing steel parts. The non-existing steel parts are allocated to at least one steel processing machine. At least one layout of the non-existing steel parts on at least one raw product is generated to determine raw product costs. Processing cost for the at least one raw product by the at least one steel processing machine is determined. Remnant values of the at least one raw product is determined. Scrap for the at least one raw product is determined. Handling cost of the at least one raw product, the non-existing steel parts, the remnants, and the scrap is determined. The cost to fulfill the order is determined by adding the costs and subtracting the remnant values. A quote containing the cost is sent to the customer in response to receiving the RFQ.

In another embodiment, a software product has instructions, stored on non-transitory computer-readable media, wherein the instructions, when executed by a computer, perform steps for estimating cost to fulfill an order for non-existing steel parts. The software production includes instructions for receiving a request for quote (RFQ) containing a single manual take-off (MTO) file from a customer, instructions for processing the single MTO file to determine the non-existing steel parts, instructions for allocating the non-existing steel parts to at least one steel processing machine, instructions for generating at least one layout of the non-existing steel parts on at least one raw product to determine raw product costs, instructions for determining processing cost for the at least one raw product by the at least one steel processing machine, instructions for determining remnant values of the at least one raw product, instructions for determining scrap for the at least one raw product, instructions for determining handling cost of the at least one raw product, the non-existing steel parts, the remnants, and the scrap, instructions for determining the cost to fulfill the order by adding the costs and subtracting the remnant values, and instructions for sending a quote containing the cost to the customer in response to receiving the RFQ.

DETAILED DESCRIPTION OF THE EMBODIMENTS

Figure 1:
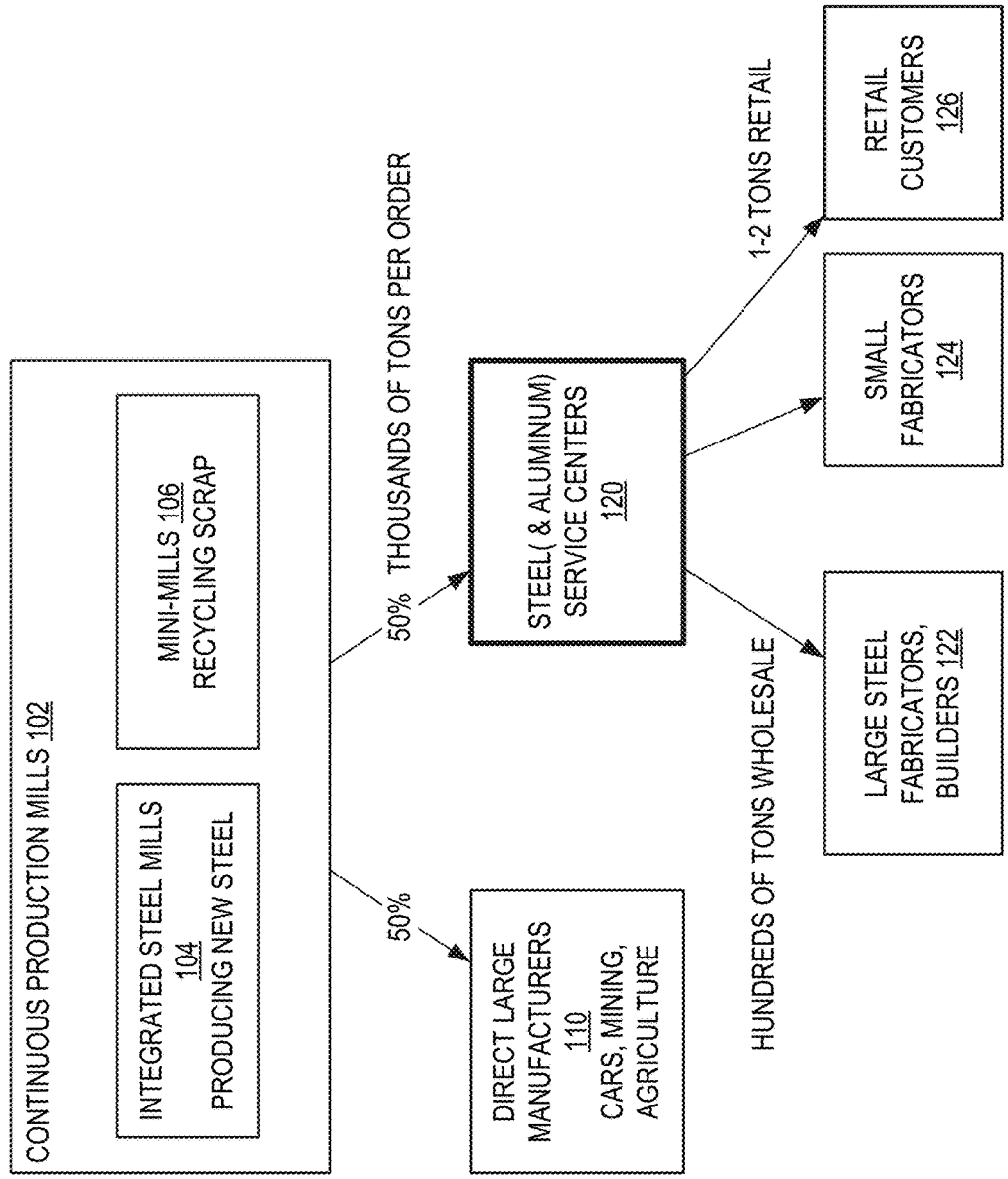
FIG. 1 is a schematic illustrating a current steel marketplace.

Working with the steel industry, the inventor has made the following observations. A customer wishing to purchase cut steel parts faces an overly complicated and lengthy process to estimate cost when the parts desired are not standard stocked items and require custom fabrication. The customer must provide drawings, often complex drawings, of the parts to a supplier such as a steel service center, where a human numerically-controlled machine (NC) programmer estimates, using a production nesting tool, an amount and types of raw steel product and effort required to manufacture the parts to provide cost estimates to supply the parts. Where the customer wishes to "shop around" for the best deal, each prospective supplier must follow a similar lengthy process to estimate cost of providing the parts.

This manual process of estimating cost of supplying parts based upon drawings often takes days, sometimes weeks, and may require the NC programmer assist in generating the estimate. As the NC programmer is often already busy processing actual orders, or has multiple orders to estimate, and additional NC programmers command considerable salaries, the time to provide the estimate increases, thereby potentially losing work to competitors of the supplier.

Since the process of providing these quotes is notoriously slow and highly variable, potential customers often request quotes from at least five different suppliers. Further, these quotes may also be requested for tender purposes. Typically, only one in five of these quotes win the jobs. In the steel service industry, half of the quotes provided are for preliminary estimates or tenders for which no one gets work. Where the customer's tender is successful, the customer then requests a more detailed quote, and the steel service center must repeat the manual process of estimating.

Thus, for the steel service center, up to ninety percent of quotes generated are wasted time for the steel service center, as they do not result in an order being placed. As the steel service centers offer more elaborate processing of cut steel, the complexity of quotes also increases, and the wasted effort of providing quotes becomes even more crippling to the industry.

Steel service centers have many individual problems when receiving and responding to quotes from customers. There is no single way of providing information for the quote; there is no single way of listing parts to be quoted, and there is no uniform way to describe each part fully with additional processes required so it may be estimated, quoted, and ultimately produced.

The steel wholesale industry is low skilled and not an engineering operation. A steel service center has the privileged position of holding the raw stock and being able, through volume, to afford expensive numerically controlled (NC) cutting machines, but is not in fact a manufacturing company and does not have a factory filled with skilled engineers, tradesmen, and welders. Few workers in each steel service center are able or qualified to professionally read an engineering drawing.

A consequential and historical problem for the steel service center is that, as a steel wholesaler, they were forced by tradition to quote steel supply. However, these same people at the steel service centers must now competitively quote complex part creation and delivery when they lack competence to do so. Even the customers of steel service centers, who are engineering companies, do not have a standard way of collecting needed information for a quote and transmitting it to the steel service center. The number of files of quite different content used across the industry for engineering design is enormous. This is a huge problem.

To solve these problems, the inventor has concluded that a single file including all the details is needed, herein referenced as the single MTO (Manual Take-off) file. Within the single MTO file, the required parts are described in great detail.

It should be noted that the MTO file used with the quotation machine or quotation engine herein described is an enhanced MTO file having features not present in prior MTO files. These additional features include:

The MTO file CAM section for quotation includes the actual shape including all holes, and not a mere rectangle. We include full shape nesting within the system.

CAD files, including DXF, DWG, CAM, and DSTV are embeddable inside the MTO file. CAM lines of the MTO file now include true weld preparation details, including profile of weld prepared edges, The MTO file now also allow layering for process identification, including, DRILL, DRILL and TAP with positions for drilling machine control, or MARK for marking both lines and text. The weld preparation includes specification of weld preparations according to U.S. Pat. Nos. 8,987,636 and 8,865,056.

Now perfect weld prepared parts can completed without human intervention.

With the single MTO file in the hands of the Steel (or Aluminum) merchant, the part designs are read, nested, and scrap, remnant, and sale weights determined on a fair basis using nesting tools and a quotation prepared.

The single MTO file proposed must also satisfy an unusual and critical need. When engineers or fabricators tender for work, the detail required for estimation has to be enough to get labor, equipment usage, scrap, remnant, and sale numbers right but does not have to be complete or detailed. No two fabricators even assemble structures the same way, weld the same way, or bolt the same way, so lower level details are typically omitted at the estimation stage of a project.

In one example scenario, a customer of steel service centers is a fabricator that wishes to tender for work from a third party. Based upon the work, the customer generates a high level product design that has basic shapes and sizes of the needed parts. The customer requests a quote from one or more steel service centers based upon this preliminary information. The steel service centers provide estimates based upon this preliminary information. In possession of the quotes from the steel service centers, the customer adds their own costs and tenders for the work to the third party. Only if the tender is successful does a 'detail draftsman' of the customer become involved to add details such as bolt holes, attachment details and weld preparation to the product design as needed for production.

The customer then requests a subsequent quote from the same service centers, but includes the added production details. Where multiple fabricators are tendering for the same work, it is fair to say that the effort of quoting for the same work is currently repeated about ten times when considering that multiple steel service centers are preparing estimates.

The embodiments described herein provide a way of eliminating this extraordinarily wasteful quotation process by (a) creating a single MTO file with a single format listing one or more parts. The MTO file may be an undetailed (i.e., raw) MTO file with details sufficient only for estimation, or it may be a detailed MTO file that is complete with production details and usable for estimation and/or immediate production, and (b) create a quote engine that allows the steel service centers to process and quote this MTO file automatically and rapidly without human intervention.

This quote engine uses production-appropriate nesting tools that allow for the detail that is unique to production rather than design. The quote engine may use nesting tools for linear, rectangular, mitered linear and full shapes including common cutting, edgesmart, separate pierces and plate edge utilization and part weld preparation. These nesting tools are not CAD tools and are not used by the customer.

The detailed MTO file defines parts, part shapes, quantities, materials and the method of manufacture including three-dimensional (3D) detail. This concept is revolutionary since not only is a single file proposed to contain all this information, but this single file contains information generated by the customer's engineers who takes responsibility for the detail and thus eliminates the need for detail engineers at the steel service centers. The single MTO file ensures fair, consistent, and fast quotation allowing for the contentious and financially dangerous areas of nesting, scrap and remnant allocation. Where the single MTO file is sufficiently detailed, it may be also be used seamlessly for production.

The use of the single MTO file allows for fully automatic processing in both quotation and production, thereby eliminating the possibility of human error.

Using the single MTO file and the quote engine, the steel service centers may provide metal and automatic processing services while customers look after the engineering aspects of their products. This will provide dramatic increases in productivity for the steel industry. For example, weld preparation done at the time of cutting eliminates a separate step in the fabrication process, reducing overall production times. Transmission of MTO files to the service center over the internet makes this possible 24/7 and seamlessly, increasing profits for all parties by eliminating wasted time, mistakes, double handling and the manual and semi manual quotation process.

FIG. 1 is a schematic illustrating a current steel marketplace 100. Continuous production mills 102 (which may include integrated steel mills 104 that produce new steel and mini-mills 106 that recycle scrap) generate steel continuously. Approximately half of the generated steel is used directly by large manufacturers 110 for cars, mining, and agriculture. The other half of the steel produced by continuous production mills 102 goes to steel service centers 120, that in turn supply large steel fabricators 122 (e.g., builders), small fabricators 124 and retail customers 126.

Steel service centers 120 were initially wholesalers operating as stockists of steel from continuous production mills 102 that was sold from the mills to customers other than large manufacturers 110. After WW2, the wholesalers renamed themselves as steel service centers 120 and started offering processing of the steel, although many offered nothing more than sawing and perhaps shearing.

In the last decade, steel service centers 120 have begun to offer steel and aluminum processing beyond basic sawing. They are buying NC machines including plasma cutters, laser cutters, waterjet, beam line drills, copers, marking machines, and mitering saws. Further, some steel service centers 120 also offer finishing processes including partial assembly, painting, powder coating, shot blasting, levelling, grinding and welding. As more processing is done by steel service center 120, those estimating a cost for supplying steel have to also consider any processing involved, and estimating becomes more involved than simply calculating or estimating the weight of steel being sold. Estimating cost of supplying steel thus goes beyond using lengths and rectangles to determine weight, and typically requires an inadequately qualified salesman to spend considerable time analyzing the customer requirements and estimating a corresponding cost.

Currently, to estimate a customer's request for quote, steel service centers 120 use one or more people that perform this manual process, which takes from hours to days, even weeks, and, even when done meticulously, the estimate is often closer to guesswork than an accurate estimate of all costs. For example, for quotation, parts are often represented as rectangles for nesting on a steel plate to determine only the quantity of raw material needed without an accurate estimate of scrap and remnant. It was common practice to add a scrap factor like an arbitrary 40%. Side by side tests between salesmen with the same quote task often reveal a factor of two between quotations for the same job with the same data. This is commercially intolerable and leads to excessive requests for quotation. To make matters worse, generally the cheapest estimate wins the order, so a solution that provides accurate, fast, and reliable estimates is needed by all parties A product called "FastCAM® QE™ Quote Everything" was created to handle some of the above problems at a retail sales level and to provide mathematical and CAD computation needed to provide an estimate by reading some of the design files. This product allows a sales person to provide an estimate without requiring knowledge at a level beyond using tables to calculate rectangular plate weight from width, length, thickness, density and other factors. Although FastCAM® QE™ allows a sales person to calculate the weight, cost and scrap associated with parts cut from a steel plate, a potential customer was still required to contact the sales person, transfer requirements in multiple files defining the requirement to the sales person, and then wait for the sales person to manually operate FastCAM® QE™ to prepare the estimate. When the sales person is not available to respond to the customer, the estimate is not prepared, and a sale is potentially lost by the steel service center. Further, it was the responsibility of the operator of FastCAM® QE™ to ensure that the necessary input files were provided by the customer and were up to date.

A commercially available product called FastCAM® MTO consolidates many Computer Aided Design (CAD) files into a single MTO file and was initially developed to allow takeoff (a process for developing a list of materials with quantities and types for building a project) to be done only once for a project and to thus encapsulate the project as a single file. However, that was all FastCAM® MTO was used for. As disclosed herein, a single MTO file (see single MTO file 330, of FIGS. 3 and 4) defines the entire project and is not just an extraction of parts. Thus the concept of the single MTO file is significantly expanded beyond the MTO file generated by FastCAM® MTO.

In previous formats of the MTO file, shapes were represented by simple rectangles that were deemed of sufficient accuracy for estimation. There was no concept that the MTO file used for quotation could also be the ultimate format for defining and transmitting the final job including details such as weld preparation and precise shapes. In the prior art, the final job specification used a completely different set of detailed separate files.

Figure 2:
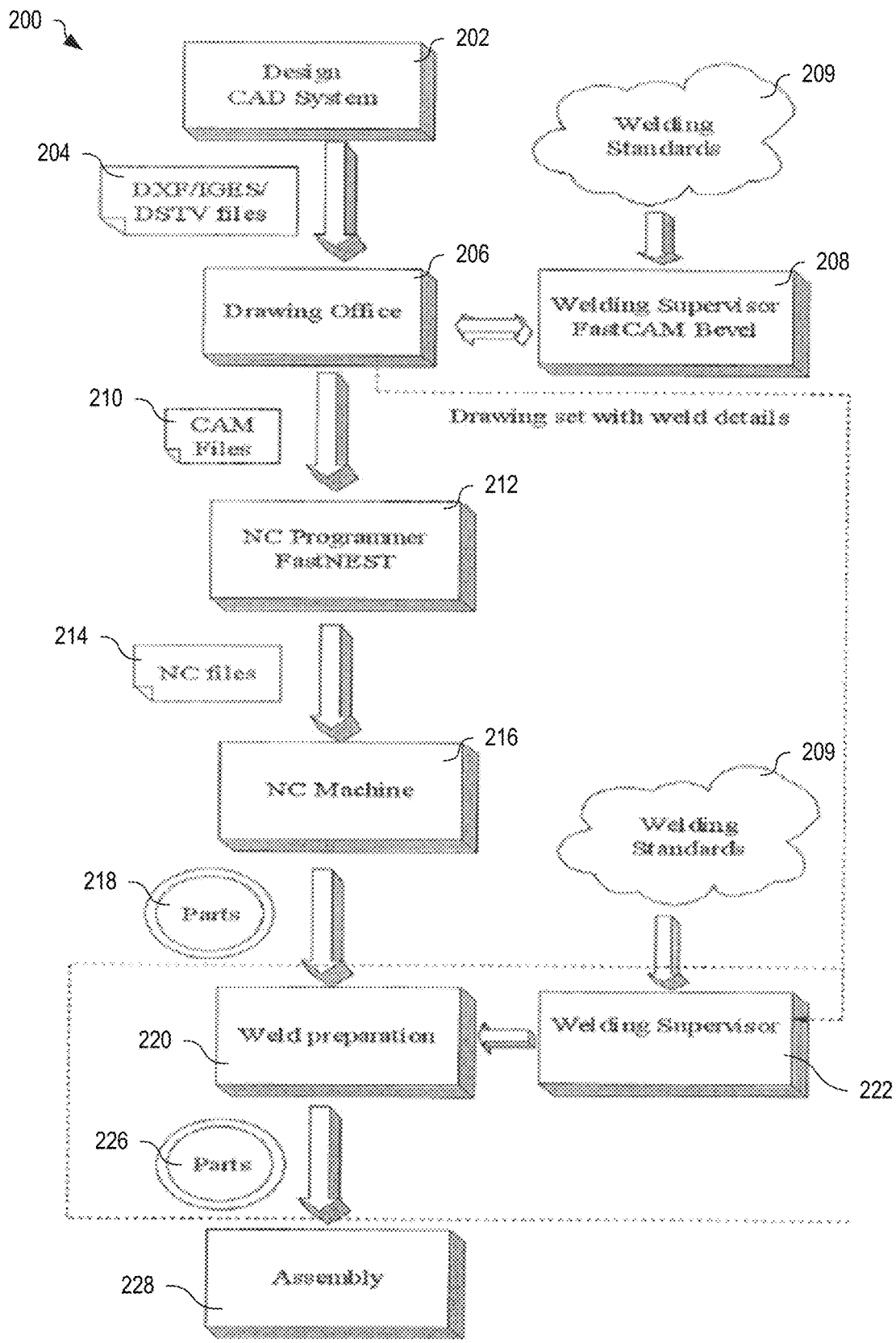
FIG. 2 is a schematic illustrating an exemplary manufacturing process for fabricating steel parts with weld preparation.

FIG. 2 shows one example prior art process 200 for fabricating a product. In step 202, method 200 uses a computer aided design (CAD) system to produce design files 204 (e.g., DXF, IGES, or DSTV formatted files as known in the CAD art) for the product. In step 206, method 200 uses a drawing office, where human NC programmers use computer aided design workstations to generate computer-aided manufacturing (CAM) files 210 that may be used for computer aided manufacture of the product. In step 208, method 200 uses a human welding supervisor to generate weld details for the product based upon welding standards 209. In step 212, method 200 uses an NC programmer to generate NC files 214, based upon nesting of parts of the product onto a steel plate, for cutting the parts from the steel plate. Note that in step 212 as detailed in the patents referenced the NC programmer does not add weld preparation information as this is already embedded in CAM files 210, thereby removing this very difficult job entirely from the responsibility of the Steel Service Center. There is in fact no programming and only nesting. In step 216, method 200 uses an NC machine to cut parts 218 from the steel plate using NC files 214. In steps 220 and 222, method 200 uses a welding supervisor, welding standards 209, and the weld preparation details from step 208 to apply weld preparation to the parts 218 to form weld prepared parts 226. In step 228, method 200 assembled the weld prepared parts 226 by welding. In the prior art, method 200 would be required to wait to receive estimates for certain stages of the development of the product. For example, in step 206, the drawing office would contact a sales person of steel service center 120 to request a quote for preparing weld prepared parts 226. The drawing office might send (e.g., FAX, emails, or postal service) many drawings showing details of weld prepared parts 226. Steel service center 120 would then manually process these drawings to determine the amount of steel plate needed, the time to cut the parts from the steel plate, the amount of waste material, and where any remaining part of the steel plate is usable for another project. Given a cost for a full steel plate, any usable remaining portion or remnant may be subtracted from the cost of the full steel plate. The process of generating the estimate may take days or even longer where additional questions arise that the customer must answer before an estimate can be determined.

The customer may request quotes from many steel service centers 120, and each steel service center goes through the same cost estimation process. However, ultimately, the customer may select a single service center 120 to supply the parts, and thus the other steel service centers have wasted a significant amount of time in preparing the quote. Since the job typically goes to the cheapest bidder, the sales persons is encouraged to provide an accurate estimate that is close to costs that would be incurred during processing should the steel service center get the job, but that is not below it (i.e., to incur a loss). If the time taken to estimate the job is too long, the customer may have already given the job to another steel service center that responded quicker. Thus steel service center 120 has a great desire to be able to provide an accurate estimate of a job in a very short amount of time.

Figure 3:
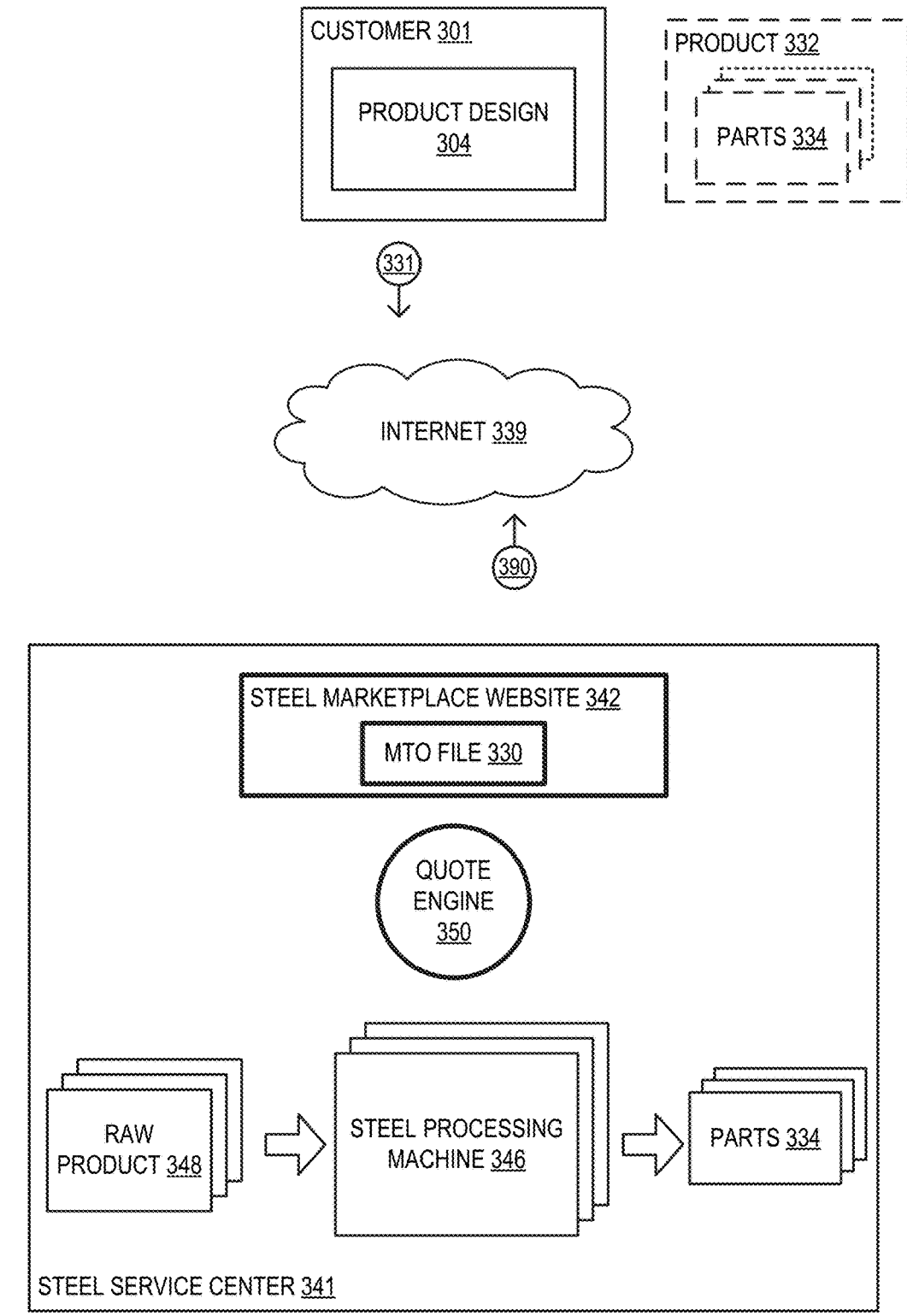
FIG. 3 shows one exemplary system for estimating cost to fulfill an order for non-existing steel parts, in an embodiment.

FIG. 3 shows one exemplary system 300 for estimating cost to fulfill an order for non-existing steel parts. A customer 301 has a product design 304 for a product 332 that includes a plurality of parts 334 that do not yet exist. For example, product design 304 is new and parts 334 are newly designed. A steel service center 341 includes one or more steel processing machines 346 capable of processing raw product 348 to produce cut steel parts 334. However, before parts 334 are manufactured, customer 301 may require an estimate of cost for steel service center 341 to supplying parts 334.

Steel service center 341 provides a steel market website 342 that is accessible from a network 339. In an alternative embodiment, website 342 is hosted by a third party internet service provider and resulting MTO files are routed to steel service centers for quotation and, if quotations are accepted and contracts formed, production of steel parts. Network 339 may represent one or more of Wi-Fi, WAN, LAN, cellular, and the Internet. Steel marketplace website 342 allows customer 30 to generate a single MTO file 330 that defines product 332 and/or parts 334 from product design 304. Customer 301 interacts with steel marketplace website 342, via network 339, and submits a request for quote (RFQ) 331 that may contain single MTO file 330. Since single MTO file 330 was generated from product design 304, single MTO file 330 defines parts 334 as completely as possible, based upon a current development stage of product design 304. Upon receiving RFQ 331, steel marketplace website 342 invokes a quote engine 350 to process RFQ 331 and to respond with a quote 390 that estimates the cost of providing parts 334 to customer 301. Quote engine 350 processes RFQ 331 automatically and without manual (human) intervention, and provides quote 390 based upon single MTO file 330, as described in detail below with reference to FIG. 4. When customer 301 places an order for parts 334, steel service center 341 uses steel processing machines 346 to process raw product 348 and produce parts 334 based upon single MTO file 330.

Since single MTO file 330 is provided by the customer, and contains engineering details, generated by customer 301, for producing product 332, customer 301 is ultimately responsible for any parts 334 produced, since no engineer at steel service center 341 has processed or added detail to single MTO file 330.

Figure 4:
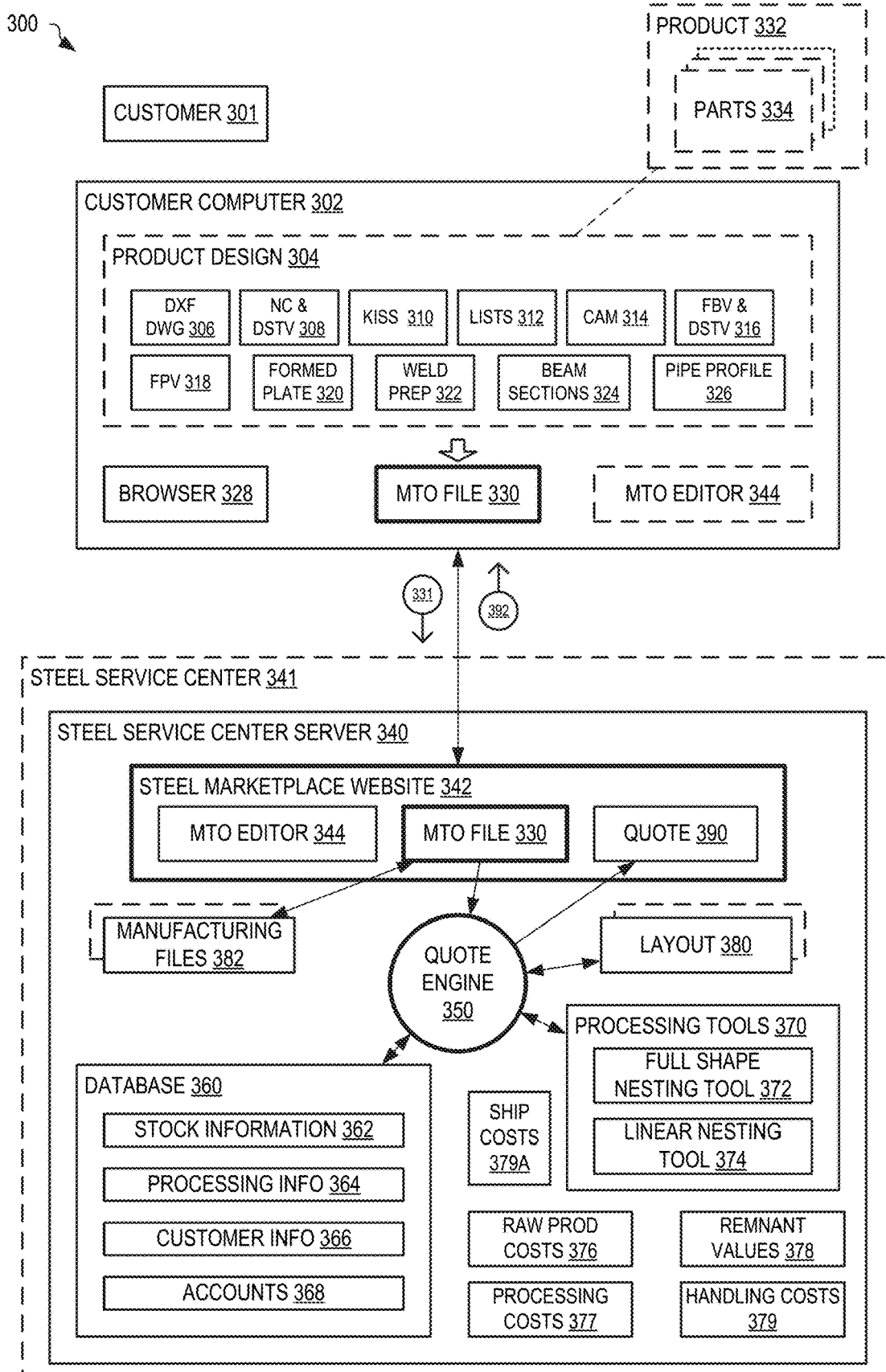
FIG. 4 shows the system of FIG. 3 in further exemplary detail.

FIG. 4 shows system 300 of FIG. 3 in further exemplary detail. Customer 301 uses a customer computer 302 to create product design 304 for new product 332, for example by using design software (e.g., computer aided design software such as FastCAM®.). Product design 304 defines parts 334 for product 332 using one or more computer-aided design file formats such as DXF, DWG 306, NC & DSTV 308, KISS 310, LISTS 312, CAM 314, FBV & DSTV 316, FPV 318, including definitions of formed plate 320, weld preparation 322, beam sections 324, and pipe profile 326. Thus, product design 304 defines each part 334 in as much detail as is currently available based upon the current stage the design process for product 332. For example, at an early stage in the design process, one or more parts 334 may only have an outline shape. At a later stage of the design process, the one or more parts 334 may also include one or more finishing processes, such as weld preparation.

At any stage of the design process, customer 301 may desire a quote for parts 334. Ideally, customer 301 desires to cost estimates for parts 334 as if they were readily available as a stocked component of steel service center 341, even though parts 334 are as yet non-existent. That is, customer 301 would like to determine cost of parts 334, via the Internet, as easily as shopping for items that are immediately available from an Internet store. Further, customer 301 may require estimates at different stages of the design process of product 332. For example, when tendering for work from a third party, customer 301 may use CAD tools to generate product design 304 without details such as weld preparation 322, since these details would be added to product design 304 once the tender is accepted and a detail of engineer of customer 301 invests time to add details to product design 304. Once the details are added to product design 304, customer 301 may request another quote from steel service center 341. Since steel service center 341 utilizes quote engine 350, the impact of providing updated quote 390 to customer 301 is minimal.

In the example of FIG. 4, steel service center 341 uses a steel service center server 340 to host steel marketplace website 342 that allows customer 301 to interact therewith, via network 339, using a browser 328 or dedicated application. In one example of operation, customer's computer 302 connects to website 342 via network 339, and thereby interacts with software operating on steel service center server 340.

In one embodiment, steel marketplace website 342 includes a link (e.g., a selectable button) that allows customer computer 302 to download an MTO editor 330 from steel marketplace website 342. MTO editor 344 is a software program with machine readable instructions that, when executed by a processor, provide functionality to automatically build or update an MTO file 330 from multiple independent design files. Where customer server 302 already stores a copy of MTO editor 344, MTO editor 344 need not be downloaded again. In certain embodiments, MTO editor 344 is executed by a processor of steel service center server 340 and interacts with customer computer 302 via network 339 and website 342 and browser 328 to build MTO file 320 from certain of the multiple independent files of product design 304 that define parts 334.

In one example of operation, customer 301 uses customer computer 302 to control MTO editor 344 to incorporate certain files (e.g., one or more of one or more CAD files of his design in formats such as DXF, DWG 306, NC & DSTV 308, KISS 310, LISTS 312, CAM 314, FBV & DSTV 316, FPV 318, together with formed plate 320, weld preparation 322, beam sections 324, and pipe profile 326) of product design 304 into a single MTO file 330 that defines parts 334 of product 332 in sufficient detail that steel service center 341 may provide an accurate quote for supplying those parts. Thus, MTO file 330 is generated to define shape, quantity, and finish processing for each part 334 defined by product design 304. MTO file 330 may completely define one or more of parts 334 and/or may only partially define one or more of parts 334. For example, where product design 304 is complete, each of the plurality of parts 334 of product 332 may be completely defined within MTO file 330. Where customer 301 is at an earlier stage in the design of product 332, and certain aspects of product 332 have not been fully finalized and incorporated into product design 304, one or more parts 334 may not be fully specified within MTO file 330.

Thus, single MTO file 330 may include embedded files that describe the geometry of parts 334 and also defines additional information including material, part number, grade, and quantity information that is missing from the embedded geometry files. In its most complete form, single MTO file 330 completely defines each of parts 334 for not only quotation, but also for manufacture. In certain embodiments, single MTO file 330 may also include assembly details of parts 334 for building product 332.

Continuing with the above example, having generated single MTO file 330, customer 301 uses computer 302 to submit RFQ 331, including single MTO file 330, to steel marketplace website 342. Where single MTO file 330 is built within steel marketplace website 342 (e.g., by interactively receiving one or more CAD files in formats such as DXF, DWG 306, NC & DSTV 308, KISS 310, LISTS 312, CAM 314, FBV & DSTV 316, FPV 318, including descriptions of formed plate 320, weld preparation 322, beam sections 324, and pipe profile 326 within MTO editor 344 operating on steel service center server 340), customer 301 may simply select a submit RFQ button of steel marketplace website 342 to submit RFQ 331.

Upon receiving RFQ 331, steel marketplace website 342 invokes a quote engine 350 to automatically generate quote 390 that includes an estimated cost for steel service center 341 to provide parts 334 to customer 301, and sends quote 390 to customer computer 302 as message 392. In one embodiment, message 392 is an email containing quote 390. In another embodiment, message 392 is a file containing quote 390 for download from steel market place website 342. In particular, quote 390 is generated quickly in response to RFQ 331. That is, quote 390 is provided to customer 301 effectively in real-time as customer 301 waits after submitting RFQ 331. For example, depending on complexity of product 332 and parts 334, quote 390 may be delivered to customer 301 within a few minutes of customer 301 submitting RFQ 331, allowing time to perform complex nesting tasks. Thus, the experience perceived by customer 301 is similar to an experience of buying parts 334 as if they are available from stock, even though parts 334 do not yet exist and have not been previously manufactured by steel service center 341.

Since quote engine 350 operates completely autonomously to generate quote 390 from single MTO file 330, customer 301 may send RFQ 331 and receive quote 390 at any time, which is a significant advantage over current practices of the steel industry that require person to person communication (i.e., limited to working hours only) and manual processing of design drawings to determine an estimate of costs to provide parts, which often takes days. More particularly, the use of quote engine 350 significantly reduces the overhead of generating quote 390 on personnel of steel service center 341 and one or more engineers are not required to analyze RFQ 331 to generate quote 390. The MTO file may include any of the common shipping agreements described as INCOTERMS including EXW (Ex Works) or FOB (Free on board) or FAS (Free Alongside Ship).

Steel service center server 340 includes a database 360 that stores stock information 360 defining stock raw steel products (e.g., steel plate thickness, sizes, and costs), and processing information 364 defining cost of applying processes (e.g., cutting, sawing, drilling, mitering, coping, beveling, finishing, and so on) to the steel plate and/or parts cut therefrom. For example, stock information 362 and processing information 364 define a fair and consistent price based on raw steel products needed and cost of processing the raw steel product that would be incurred by steel service provider 341. Database 360 may also store customer information 366 that includes contact information and preferences of customer 301, one or more delivery addresses and preferred shipping methods, and account information 368 of customer 301 including previous quotes and orders provided to customer 301.

To generate quote 390, quote engine 350 processes single MTO file 330, breaking it down into individual parts 334 such as list items, long products, and flat products. Quote engine 350 then allocates individual parts 334 to one or more steel processing machines 346 that would handle required processing of raw product 348 to produce the parts 334. Quote engine 350 then determines a raw product costs 376 based upon quantity of raw product 348 needed, an amount scrap produced, remnant values 378 if any, and processing costs 377 for each steel processing machines 346 to complete optimum machining for each raw product 348 to produce parts 334. Processing costs 377 are determined based upon steel processing machine 346 selected to process the raw product 348 and a corresponding layout 380. For example, processing costs 377 may include a cost for time to setup and maintain steel processing machine 346, a cost for processing time on steel processing machine 346, and so on. Quote engine 350 may also determine handling costs 379, defined within stock information 362 and/or processing information 364 for example, for raw products 348, scrap, remnants, and produced parts 334. In some embodiments, quote engine 350 includes estimating shipping costs 379*a*. Quote engine 350 then generates quote 390 based upon raw product costs 376, processing costs 377, remnant values 378, shipping costs, and handling costs 379.

Quote engine 350 estimates shipping costs 379*a* based upon a weight of the steel parts, a volume of the steel parts, an address of the customer, the steel service center's address, distance between the customer and service center, delivery date, and a preferred shipping method of the customer.

Since steel is typically shipped by rail or heavy truck within the United States, and by water when routed to Hawaii or Alaska from suppliers not in those states, a distance and shipping method-based shipping cost and delivery time estimate is prepared by quote engine 350 and added to the quote 390. Shipping costs are often substantial since many steel parts are quite heavy. Since shipping costs are often particularly high from remotely located service centers, local service centers may often have an advantage.

In some embodiments, where customer and service center are not located in the same country and shipments must cross international borders, quote engine 350 adds an expected custom's duty based upon known tariffs to the quote 390.

In one example of operation, quote engine 350 generates one or more layouts 380 for raw product 348 defined within stock information 360. Each layout 380 may define a nest of parts on raw product 348 (e.g., a steel plate) in preparation for cutting by steel processing machine 346 (e.g., an NC plasma cutting machine) and may include finishing actions (e.g., weld preparation) when defined. Based upon layouts 380, quote engine 350 determines if any portion of raw product 348 that would remain after cutting of parts 334 therefrom is of sufficient size that it may be restocked and used for other parts/jobs. Quote engine 350 may also determine an amount of scrap material that would be left after cutting parts 334 from raw product 348.

Figure 5:
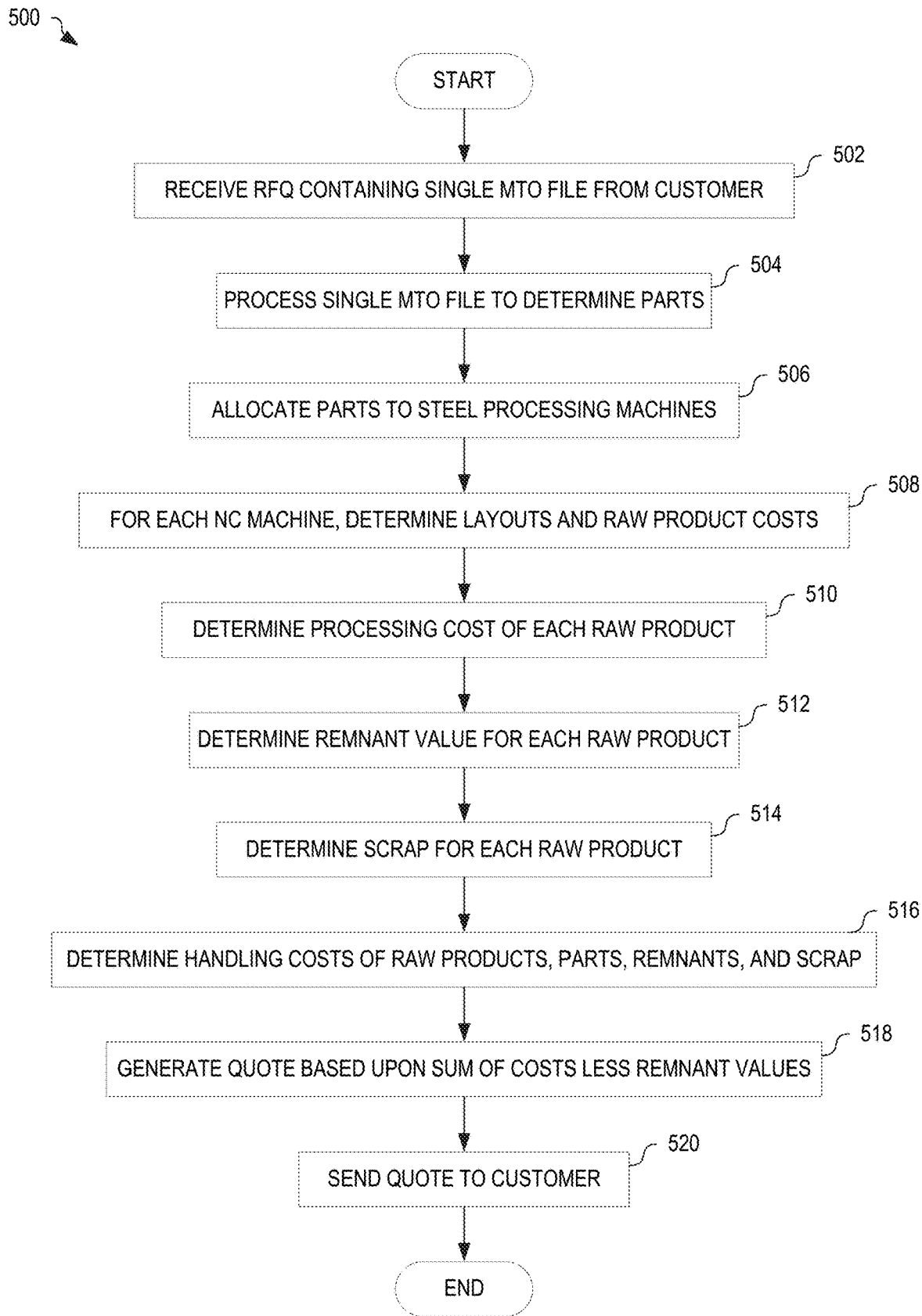
FIG. 5 is a flowchart illustrating one example method for estimating cost to fulfill an order for non-existing steel parts, in an embodiment.

FIG. 5 is a flowchart illustrating one example method 500 for estimating cost to fulfill an order for non-existing steel parts. Method 500 is for example implemented within quote engine 350 operating within steel service center server 340.

In step 502, method 500 receives an RFQ containing a single MTO file from a customer. In one example of step 502, steel marketplace website 342 receives RFQ 331 containing MTO file 330 from customer 301. In step 502, method 500 processes the single MTO file to determine parts. In one example of step 504, quote engine 350 processes single MTO file 330 to determine parts 334 defined therein. In step 506, method 500 allocates the parts to one or more steel processing machines. In one example of step 506, quote engine 350 allocates each of parts 334 to one of steel processing machines 346. In step 508, method 500, for each NC machine, determines layouts and raw product costs. In one example of step 508, quote engine 350 uses one or more processing tools 370 to generate layouts 380 for parts 334 on one or more raw products 348 and determines raw product costs 376 using stock information 362.

In step 510, method 500 determines processing cost of each raw product. In one example of step 510, quote engine 350 uses processing information 364 of database 360 to determine processing costs 377 for processing raw product 348 based upon a corresponding layout 380. In step 512, method 500 determines a remnant value for each raw product. In one example of step 512, quote engine 350 uses stock information 362 and layout 380 for each raw product 348 to determine remnant values 378. In step 514, method 500 determines scrap for each raw product. In one example of step 514, quote engine 350 determines an amount of scrap expected for each raw product 348 after processing based upon a corresponding layout 380. In step 516, method 500 determines handling costs of raw products, parts, remnants, and scrap. In one example of step 516, quote engine 350 uses processing information 364 to determining handling costs 379 based upon parts 334 determined in step 504, remnants determined in step 512, and scrap determined in step 514.

In step 518, method 500 generates a quote based upon sum of costs less remnant values. In one example of step 518, quote engine 350 calculates quote 390 as the sum of raw product costs 376 determined in step 508, processing costs 377 determined in step 510, and handling costs 379 determined in step 516, less remnant values 378 determined in step 512.

In step 520, method 500 send quote to customer. In one example of step 520, quote engine 350 sends quote 390 to customer computer 302 of customer 301.

Figure 6:
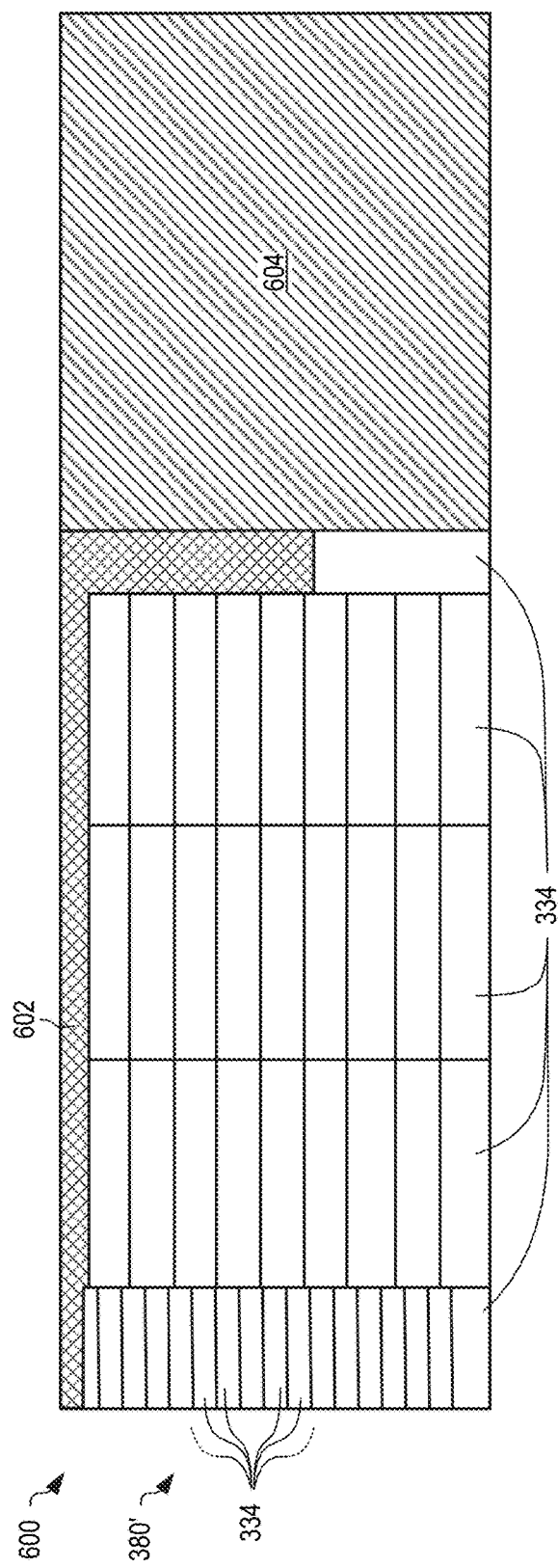
FIG. 6 shows one example layout generated by the quote engine of FIG. 4 for a plurality of rectangular parts nested on a steel plate, in an embodiment.
Figure 8:
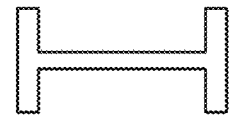
FIGS. 7 and 8 show one example layout that nests three beam parts on a steel "I" beam to leave a remnant portion that may be returned to stock, in an embodiment.
Figure 7:
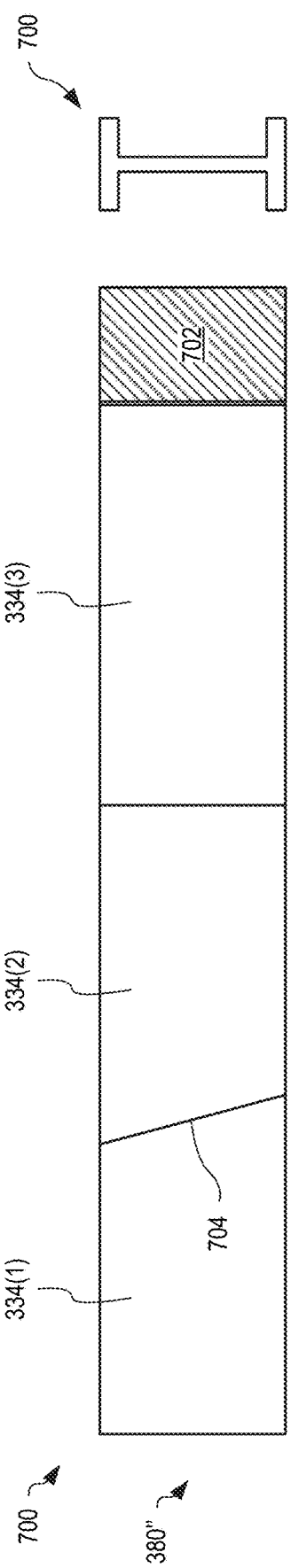

FIG. 6 shows one example layout 380' generated by quote engine 350 for a plurality of (rectangular) parts 334 nested on a steel plate 600 that result in a waste portion 602 and a remnant 604 large enough to be useful for fabricating other parts and thus returned to stock. FIGS. 7 and 8 show one example layout 380" that nests three I-beam parts 334 on a steel "I" beam 700 to leave a remnant 702 that may be returned to stock. In particular, processing tools 370, and in particular linear nesting tool 374, inverts part 334(2) such that mitered ends of parts 334(1) and 334(2) form an optimal single cut 704. While matching angles are rare the general requirement to flip mitred beams in nesting is still necessary and produces large savings. Conversely where such optimization is not performed for miters, significantly more scrap is typically produced and raw material wasted.

Accordingly, by accurately calculating, through efficient nesting using processing tools 370, quote engine 350 may identify remnant portions 604 and 702, and determine a cost of quote 390 may be reduced accordingly, and thereby made more competitive without risk, as compared to including a cost for the entire steel plate 600 and/or steel "I" beam 700. Unused portions of raw steel product (e.g., steel plate 600, steel "I" beam 700) that are not large enough or shaped that they could be used on another project are considered waste.

By generating one or more layouts 380, quote engine 350 calculates nesting efficiencies, raw steel product costs, remnants that may be deducted from the cost of the raw steel product. In certain embodiments, quote engine 350 also determines scrap and handling (of scrap, remnant, and parts) to improve accuracy and consistency for estimating the cost of parts 334 for quote 390. In one embodiment, quote 390 is comprehensive and each part 334 is detailed with graphics, cost, and sale price as if parts 334 were selected for purchase from stock.

Figure 9:
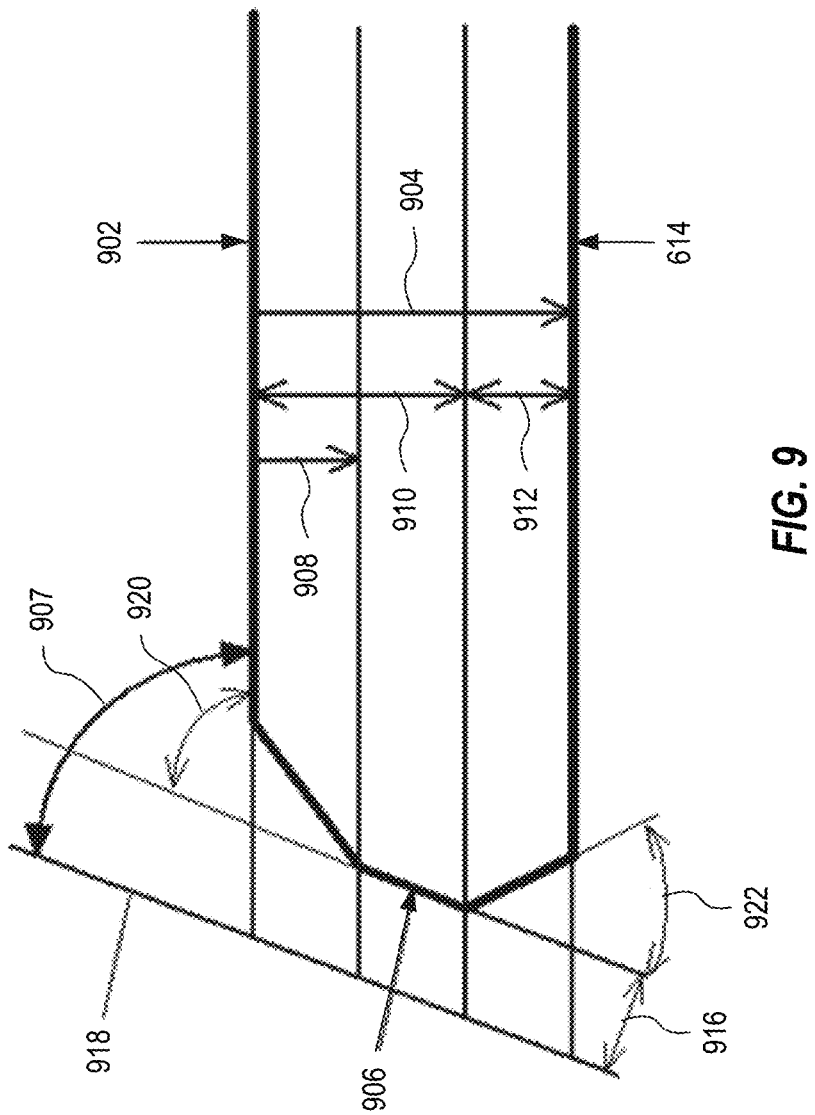
FIG. 9 shows example weld preparation information that may be included within the single MTO file for the parts of FIG. 4, in an embodiment.

FIG. 9 shows example weld preparation information that may be included within single MTO file 330 for one or more of parts 334. See for example U.S. Pat. Nos. 8,987,636 and 8,865,056, both of which are incorporated herein by reference, that describe weld preparation in further detail. In complex formed plate, weld preparation information may change continually along a single edge. In the example of FIG. 9, part 334 is cut from a steel plate (a raw steel product) having a top surface 902 and a thickness 904. The edge of part 334 has a weld face 906 at an angle 907 and with a top depth 908, a bottom depth 910, and a bottom height 912 above a bottom surface 914 of the plate. As room is left for weld material, a root gap 916 is defined between weld face 906 and an opposite surface 918. Weld face 906 is usually welded first and then the two grooves, shown as their groove angles 920 and 922. Quote engine 350 uses this weld preparation information when nesting parts 330 within layout 380, and when determining processing time for each part.

To determine nesting efficiency, for example, quote engine 350 uses one or more processing tools 370 to generate one or more layouts 380 that nest parts 334 (as defined within MTO file 330) on a raw steel product (e.g., a steel plate or beam) for cutting and/or shaping. Processing tools 370 may include a full shape nesting tool 372 and a linear nesting tool 374 that are selectively used to optimally position parts on the raw steel product. Processing tools 370 may also include one or more of FastBEAM™ product for NC processing of beams including sawing, drilling, mitering, coping, beveling information, FASTCAM® drawing system for 2D cut components and including description of standard weld preparation for 1, 2 and 3 pass cutting, FastNEST® Nesting system for flat place of CAM files and other formats including those above, FastTRACK® True shape remnant tracking system which also tracks value, location, parentage, provenance and calculates, and FastCUT® Rectangular and linear optimization software including cut to length optimization. In generating quote 390, quote engine 350 takes into account one or more of a cost of each raw steel product, a cost of any remnant of that raw steel product that would remain after cutting parts 334 therefrom, and any waste or scrap resulting from the cutting of the parts 334, and any cost of handling that waste or scrap. Processing tools 370 apply all available efficiencies for nesting parts 334 onto the raw steel product, such as one or more of edge starts and gap starts that allow parts to be positioned at edges of a steel plate, and parts to be positioned adjacent to one another without requiring piercing by utilizing gap starts. See for example, U.S. Pat. Nos. 7,469,620, 8,433,435, 8,761,919, and 9,020,628, each of which is incorporated herein by reference, that discuss elimination of external piercing in NC cutting of nested parts.

Quote engine 350 may also use layouts 380 to determine a cost of cutting parts 334 from the raw steel product based upon the optimized nesting, cutting speed, and any finishing or shaping that may be applied during the cutting (e.g., weld preparation), and then incorporate these costs into quote 390. Processing information 364 may also define a cost of handling parts, once cut, based upon size and quantity for example, and for applying any finishing processes defined within single MTO file 330. Since single MTO file 330 defines each part 334 in as complete detail as currently available, quote engine 350 determines quote 390 with a correspondingly accurate cost for steel service center 341 to supply parts 334 to customer 301 (i.e., including manufacturing the parts, applying any finishing processes such as shot-blasting, leveling, grinding, painting, powder-coating, oxide removal, bending, assembly, and so on). MTO editor 344 and quote engine 250 are configured to use all available information of parts 334 from product design 304 within single MTO file 330. Thus, only single MTO file 330 is needed from customer 301 to automatically generate quote 390.

Figure 10:
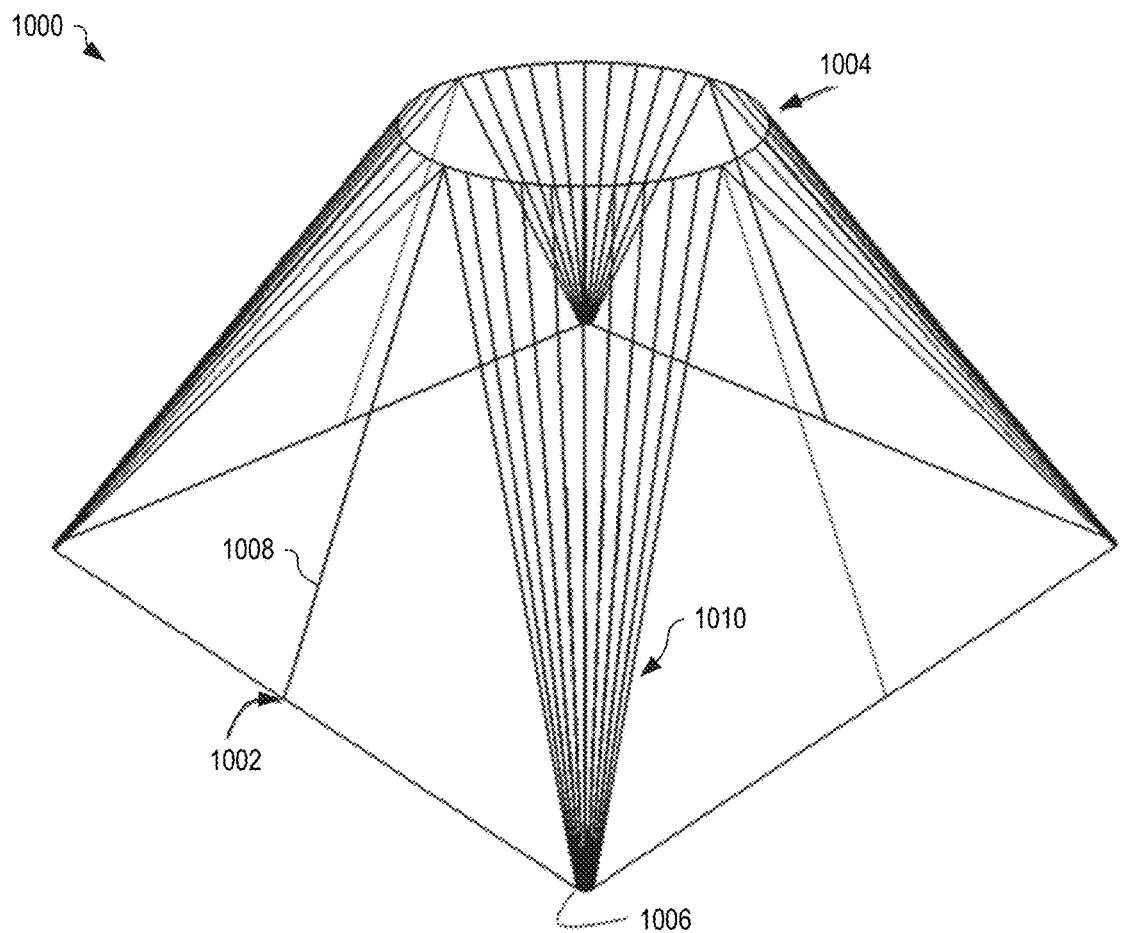
FIG. 10 shows an example 3D object cut and formed from flat thick plate that may represent at least part of the product of FIGS. 3 and 4.
Figure 11:
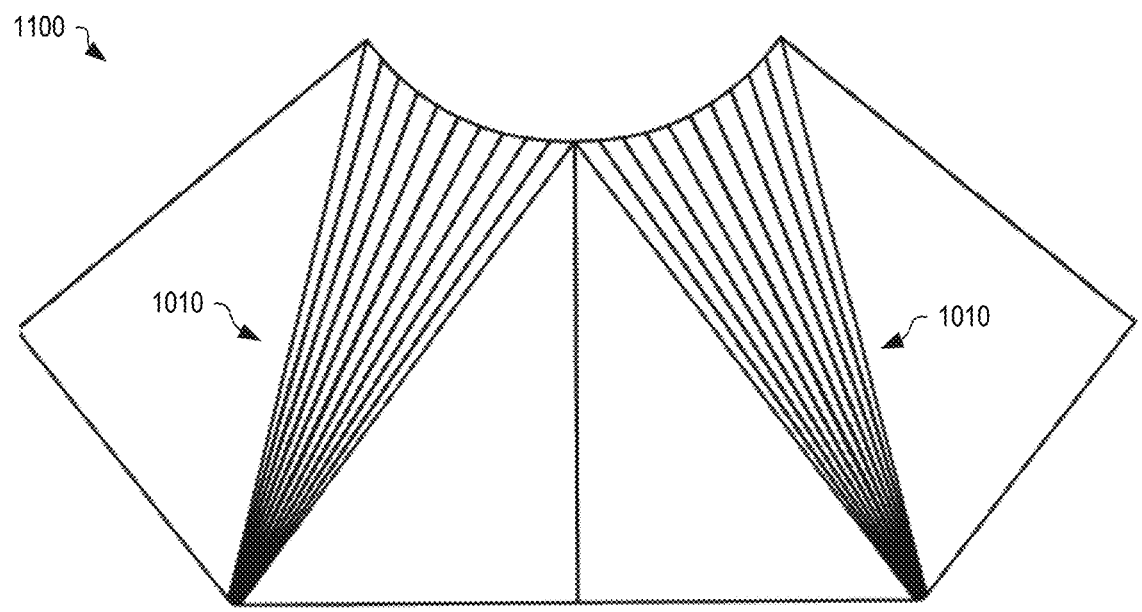
FIG. 11 shows a single CAM file outline for half of the 3D object of FIG. 10.

Single MTO file 330 may also define bending lines and assembly instructions. FIG. 10 shows an example 3D object 1000 to be made from flat thick plate. 3D object 1000 is a square 1002 to round 1004 structure to be developed as individual flat plate CAM files, including weld preparation and bending lines. Note the rounded corners 1006 required for plate not sheet metal. Sheet metal bends relatively easily compared to plate, where bending results in a radius in the corner at 1006. One of four possible seams 1008 is indicated at which welding may be required and that weld preparation information is therefore defined (see the example of FIG. 9). Bend lines 1010 are not cut but are marked on the plate with bend angles to facilitate forming in a press. FIG. 11 shows a single CAM file outline 1100 for half of 3D object 1000 of FIG. 10. In this example, weld preparation is required on all vertical edges. CAM file outline 1100 represents half of 3D object 1000; however, taller structures may be broken vertically as well as horizontally, in to many 'strakes' and horizontal joins must also be weld prepared.

Where single MTO file 330 is sufficiently detailed for production, one or more manufacturing files 382, such as NC control programs for controlling the NC cutting machine to cut parts 334 from raw steel product based upon layout 380 that defines the optimized nesting of the parts, may be generated directly from the single MTO file. Manufacturing files 382 may also be generated directly from single MTO file 330 to define other processes (e.g., finishing processes such as painting, grinding, etc.) to be applied to one or more of parts 334 once they are cut from the raw steel product. Layouts 380 and manufacturing files 382 may be used during manufacture of parts 334, should steel service center 341 receive an order for the parts from customer 301. In certain embodiments, steel service center server 340 may store layouts 380 in anticipation of receiving the order from customer 301. However, where product design 304 is updated (e.g., details added) after quote 390 was generated, customer 301 may provide a new single MTO file 330 and quote engine 350 and processing tools 370 may be used to regenerate layouts 380 and the new single MTO file 330 may be used to generate manufacturing files 382.

In one example scenario, customer 301 is preparing new product 332 for a client, and may require an early quote for parts to estimate a cost of the product to that client. Thus, customer 301 may request a first quote (e.g., quote 390) at an early stage of the design process of product 332, to avoid unnecessary work on a product when cost of parts exceeds a client's budget and thus an order for product 332 is not likely. By using system 300, customer 301 may obtain quote 390 at any one or more stages of the design process of product 342, wherein as detail is added to product design 304, each retrieved quote 380 becomes more accurate. Since quote 390 is generated automatically and without human intervention, the cost to steel service center 341 for repeatedly providing quote 390 is minimal. That is, employees of steel service center 341 are not continually tied up providing and updating quotes for parts 334 that may not result in an order to actually provide those parts.

Figure 12:
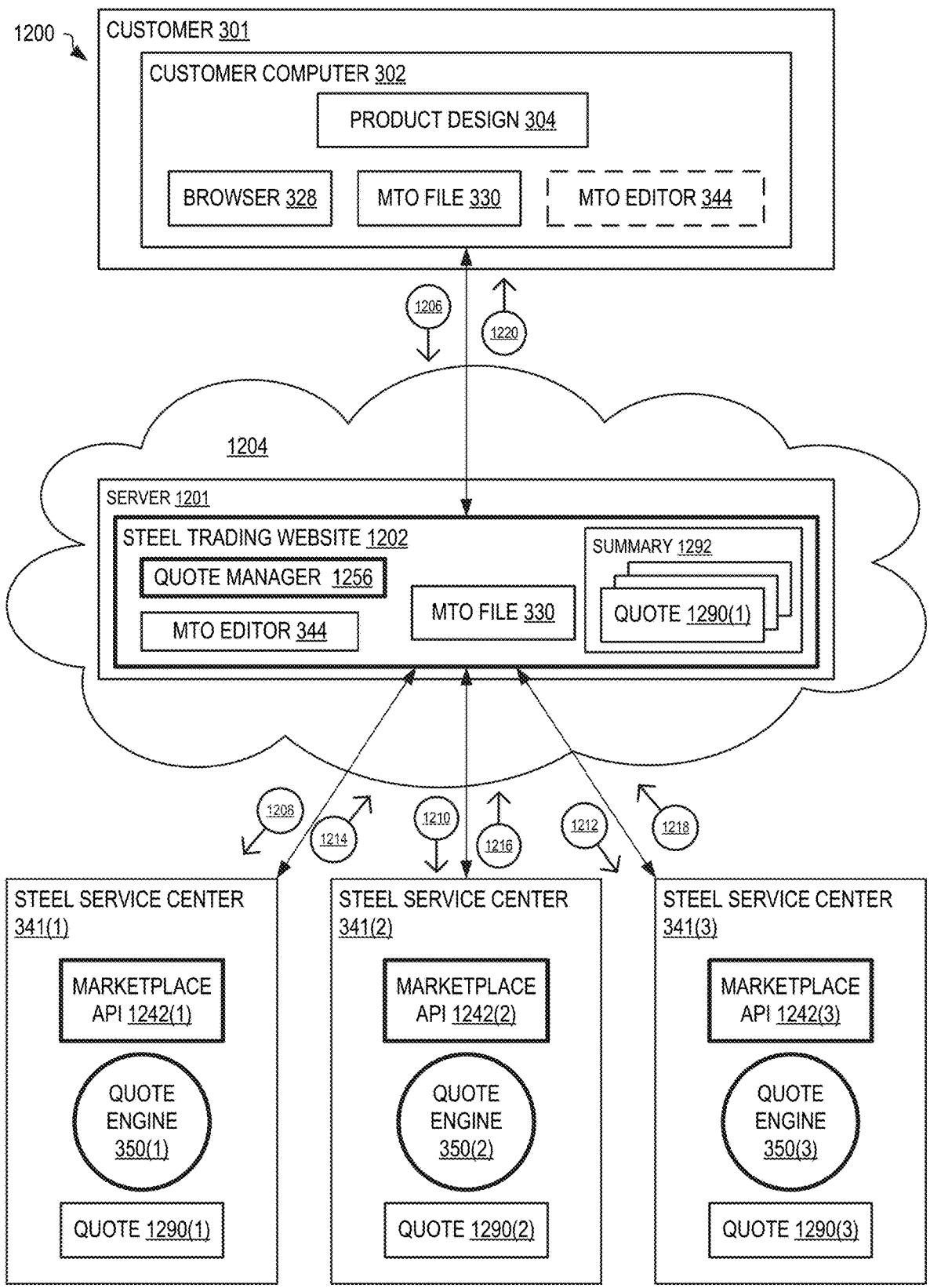
FIG. 12 shows one example steel trading website that facilitates estimating cost to fulfill an order for non-existing steel parts, in an embodiment.

FIG. 12 shows one example steel trading website 1202 that facilitates estimating cost to fulfill an order for non-existing steel parts. Steel trading website 1202 is implemented using a server 1201 that is a computer with a processor and memory storing machine readable instructions that are executable by the processor to provide the functionality of steel trading website 1202 described herein. Steel trading website 1202 is accessible via a computer network 1204, which may include the Internet, wherein steel trading website 1202 may be considered to operate within the "cloud".

Similar to FIGS. 3 and 4, customer 301 uses customer computer 302 to create product design 304 for new product 332, as described above. However, in the example of FIG. 12, customer 301 wishes or a purchasing officer is obliged to "shop around" and receive multiple quotes for buying parts 334 for product 332. Rather than contact each of a plurality of different steel service centers 341 directly, customer 301 interacts with a steel trading website 1202. In certain embodiments, similar to steel marketplace website 342, steel trading website 1202 provides MTO editor 344, and/or functionality of MTO editor 344, to allow customer 301 to build MTO file 330 based upon product design 304, as described above. Customer 301 then uses computer 302 to submit, via network 1204, an RFQ 1206 including MTO file 330 to steel trading website 1202. A quote manager 1256 of steel trading website 1202 receives RFQ 1206 and generates and sends multiple similar RFQs 1208, 1210, and 1212, that each contain MTO file 330, to corresponding steel service centers 341(1), 341(2), and 341(3), respectively. In one embodiment, quote manager 1256 automatically selects steel service centers 341(1), 341(2), and 341(3) from a plurality of steel service centers based upon RFQ 1206. For example, where RFQ 1206 defines a particular raw steel product and/or finishing process, quote manager 1256 may select steel service centers 341(1), 341(2), and 341(3) that are capable of providing that product and/or service. Advantageously, steel trading website 1202 provides a single "shopping location" for customer 301.

Within each steel service center 341(1)-(3), as described above, quote engine 350(1)-(3) processes received RFQ 1208, 1210, and 1212 to generate a quote 390(1)-(3), which is returned as response 1214, 1216, and 1218, respectively, back to quote manager 1256. In one embodiment, quote manager 1256 generates a summary 1292 containing each received quote 1290(1)-(3), and sends summary 1292 to customer computer 302 as message 1220. In another embodiment, quote manager 1256 sends each quote 1290 directly to customer computer 302 as received from steel service center 341.

In certain embodiments, each steel service center 341 is configured with a marketplace application programming interface (API) that facilitates communication of RFQs 1208, 1210, 1212 and quotes 1214, 1216, and 1218, directly between server 1201 and steel service center 341 via network 1204. For example, quote manager 1256 may interact directly with quote engine 350 via Internet 1204 using marketplace API 1242.

In one embodiment, steel trading website 1202 receives remuneration from steel service center 341 when customer 301 places an order corresponding to MTO file 330 with steel service center 341. In another embodiment, customer 301 remunerates steel trading website 1202 for providing summary 1292 and/or quotes 1290. In another embodiment, customer 301 subscribes to, and makes a corresponding payment for, services provided by steel trading website 1202.

Figure 13:
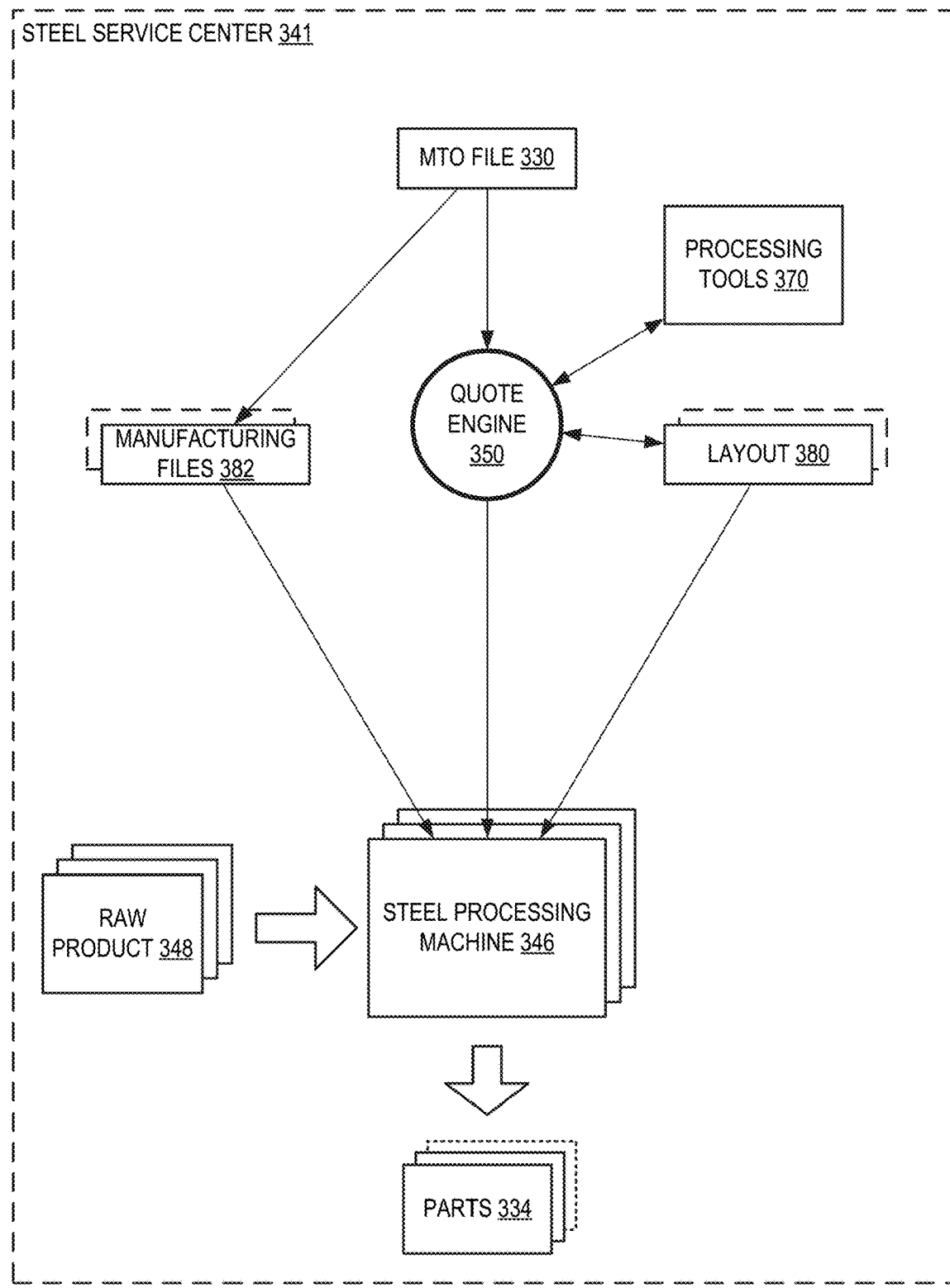
FIG. 13 shows one exemplary system for estimating cost and fulfilling an order for non-existing steel parts, in an embodiment.

FIG. 13 shows system 300 of FIGS. 3 and 4 and illustrates control of one or more steel processing machines 346 to process raw product 348 and produce parts 334. Steel processing machines 346 represent NC machines selected from the group including saws, miter saws, band saws, reciprocating saws, friction saws, drills, mills, plasma profilers, oxy acetylene multi torch profilers, laser profilers, waterjet profilers, beam lines of many types, copers, presses, and punches. As described above, quote engine 350 processes MTO file 330 and generates layout files 380. The single MTO file 330 may also be used to directly generate manufacturing files 382. One or more of layout files 380 and manufacturing files 382 are used to control one or more steel processing machines 346 to process raw product 348 (e.g., steel plate, "I" beams, and so on) and produce parts 334 as defined by MTO file 330. Advantageously, since MTO file 330 may contain a full and detailed description of each part 334, layouts 380 and manufacturing files 382 may be automatically generated for parts 334.

Since the MTO file as used with an RFQ may differ from a current MTO file at the time of ordering, the system verifies consistency between a quoted MTO file and the MTO file at the time of ordering. If the files differ, a new quotation is produced and, if the new quotation exceeds the original quote, an operator is notified. If the current MTO file and the quoted MTO file differ, any NC machine control files and CAM files are re-generated to ensure only current designs are produced.

MTO File Format

Figure 14:
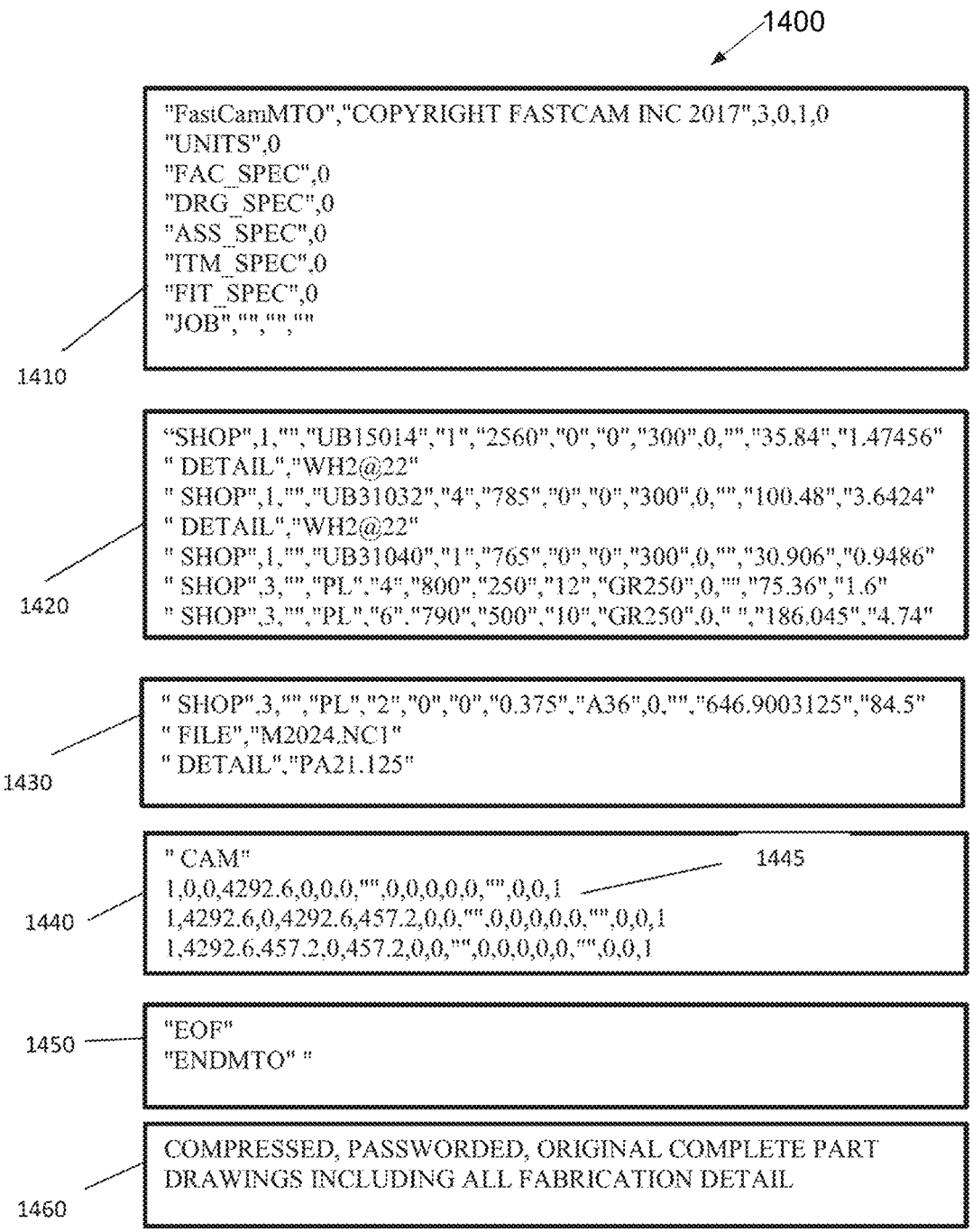
FIG. 14 illustrates a format of an MTO file for use with the steel bidding system and trading websites described herein.

In a particular embodiment, for illustration of MTO file content, MTO file 1400 (FIG. 14) has a file header and multiple sections in text based Comma Separated Variable (CSV) format, General header 1410 and a list of structural sections 1420, 1430 and flat shapes 1440 finished by an "EOF", End of File statement.

Within sections such as 1420, the type of section UB15014, cutoff details, holes and hole patterns (many at 22 mm diameter) are listed. This is necessary for estimation, while actual hole locations are not provided.

1430 shows a reference to an input which is in DSTV format, ending as a filename M2024.NC1. This file is not included, simply the reference. Generally the actual file is not needed for estimation and quotation.

The section 1440 is for flat parts, using our CAM format for lines, arcs, points and holes, one such per line in 1440. Flat components also in DSTV format are converted into this format.

So without further detail it can be seen the summary file for estimation, quotation and trading is easily read. It is also clear it is not complete for production. While the drilled hole numbers and diameter are included, the actual position is not. Also in the CAM section, much more additional information is now included on each entity line to fully detail weld preparation. Marking and text lines and more for plate parts to be formed are also included.

Historically, once the deal for supply is done, the customer supplies all the details. This can still occur and is outside the scope of this invention. Section 1460 is added as a passworded, encrypted, compressed addendum to be unlocked by and only by the successful bidder. Once the MTO file is accepted by the steel service center, information from each part summary and detailed drawing is extracted and compiled into instructions for personnel, such as a list of materials to fetch from a warehouse, or instructions necessary for setup of computer-controlled manufacturing machines such as cutting, milling, and drilling machines. Information from each part summary and detailed drawing computer-aided manufacturing files is also automatically compiled into computer-aided manufacturing files adapted to control each computer-controlled manufacturing machine to be used in manufacturing the parts.

When the parts are manufactured, information from the MTO file delivery address and shipping method section is extracted and used in shipping the parts to the customer.

The MTO file exists in machine readable form on the customer's computers and the steel trading website or service center's computers. When a website or service center's computers see a later-numbered version of an MTO file having the same unique identifier, that website or service center replaces the MTO file with the later, extended, MTO file for requotation and manufacture.

Metal Trader Providing Apps to Customers

Figure 15:
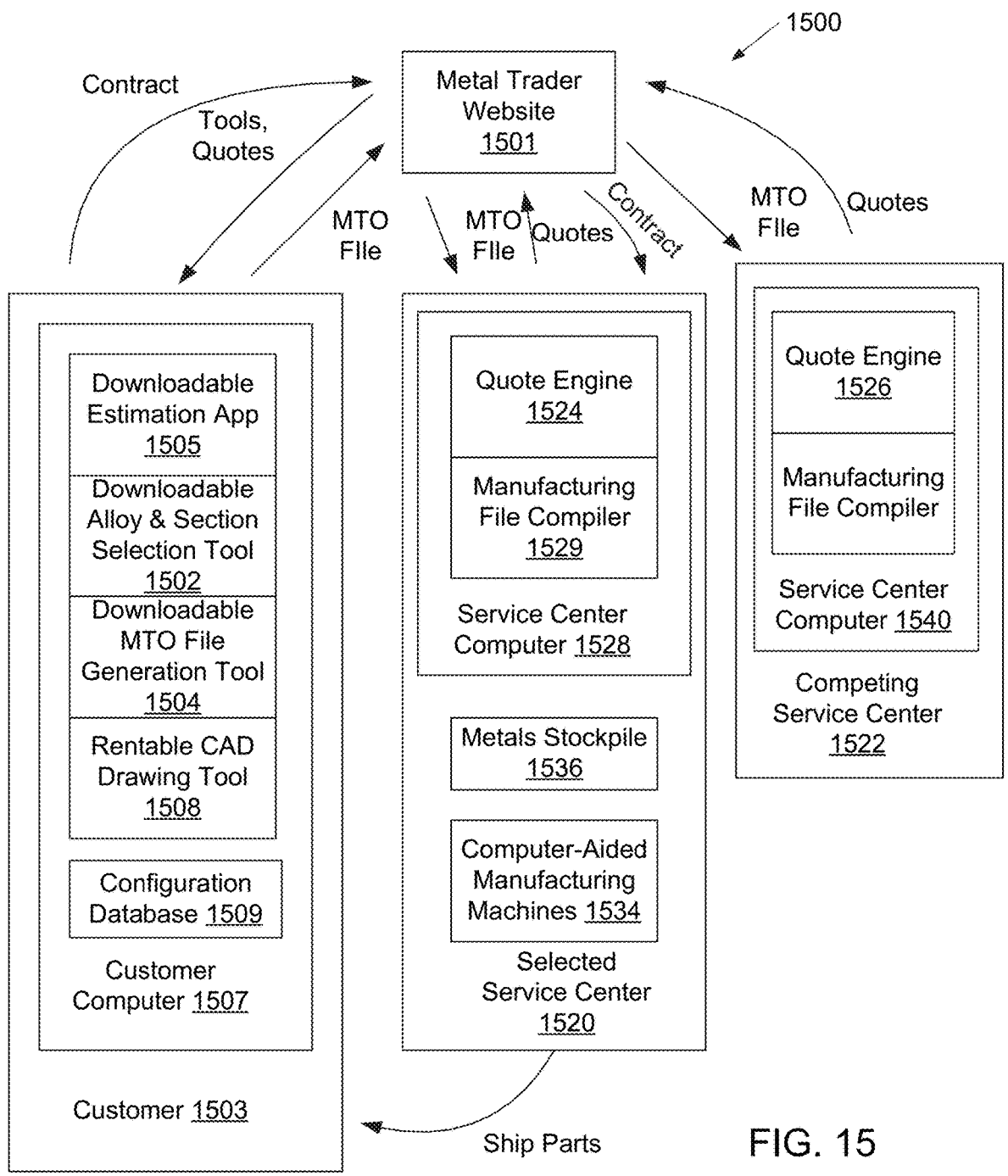
FIG. 15 illustrates an alternative embodiment where a centralized trading website provides applications and software to a customer, receives MTO files from the customers, provides MTO files to multiple metals service centers, receives quotes from the metals service centers, selects a winning metals service center, and has the selected service center provide parts to the customer.

In an alternative embodiment 1500 illustrated in FIG. 15, a centralized trading website 1501 provides applications to a customer 1503, such as a downloadable cost estimation application 1505, metal type, and alloy selection application 1502, and MTO generation software 1504. Some software necessary to complete a design, such as CAD design software 1508, may be rented to the customer. The downloaded and rented apps and software reside on, and are executed on, customer's computer 1507 together with a database 1509 that includes customer information including billing address, delivery addresses, and similar information. The metal trader receives preliminary MTO files from the customer, the preliminary MTO files lacking one or more sections including the clear-to-manufacture section 834 section. The metal trader may then send the preliminary MTO files to metal service centers 1520, 1522, who then may check inventory and manufacturing requirements to determine if this is an order they can produce, and then return quotes to the metal trader 1501 by running quote engines 1524, 1526 on their computers 1528, 1530. The metal trader marks up the quotes and passes a selected, marked up, quote on to customer 1507.

When the MTO file is complete with a clear-to-manufacture section 834, the metal trader repeats sending the completed MTO file to the service centers 1520, 1522 and selects a quote from a winning metals service center 1520, this is passed to the customer 1503 for final order verification. The metal trader then instructs the winning metals service center 1520 to produce the parts.

Producing the parts is done by first using manufacturing file compiler 1529 running on service center computer 1530 to generate computer-aided manufacturing files adapted for operation on service center 1520's computer aided manufacturing machines 1534, then remove stock from its metals stockpile 1536 and process that stock using its computer aided manufacturing machines 1534 to produce the parts. The winning service center 1520 then ships the parts to customer 1503.

It is important to note that there are multiple ways of creating a business to business experience. In some cases, quotations may be obtained by installing a steel-buyer application program including MTO-assembly, quotation, and ordering functions, on the steel-buyer's computer; once this application has assembled an MTO file, it acts according to the UBER model to request multiple quotations. The multiple quotations may be viewed with an email utility, or, if returned to the steel-buyer application, may be displayed to a user after sorting by cost, delivery date, and proximity.

The final deal is done between the person buying and the steel service provider with a copy to the steel trader. It is envisaged that the steel trader will bill the supplier for the service, much as many service providers.

In an alternative embodiment, the system operates potential interface through a steel marketplace website in a model resembling Trivago or HOTELS.COM, or deals directly with a service center web site.

Neither steel customers nor steel suppliers are sophisticated data processing internet companies and their businesses are more reminiscent internally of the late 20th century where the facsimile machine is still an essential innovation.

The Key Ideas

Summarizing the above, the disclosed systems and method provide the following features and advantages:

Quote Engine Over the internet: The systems and methods correctly and quickly prepare a quotation for cut steel and may be operated by a customer through the internet.

Quote Engine can be driven wholly by a single MTO file: The systems and methods respond to a single file that contains the list of parts, the exact geometric description of the desired parts, and all processing this is to be performed on the parts including but not limited to drilling, tapping, boring, weld edge preparation, marking for forming, text for part identification and edge identification.

Quote Engine universal for all material types, shapes and processes: The systems, methods, and MTO file including long products such as I beams, H beams, channel, angle, bulb flat, merchant bar, RHS, SHS, walkway, grating and specific stock shelf products and oddments and exact shape for profiled parts whether milled, plasma cut, oxy cut, laser cut, or waterjet cut.

MTO embedded parts complete: For production, the MTO file must contain the geometrically accurate and complete description of all parts desired in a single order from the steel service center including but not limited to weld preparation, drilling details, tapping details, text to be imprinted, and to high precision except those parts which are simply oddments or shelf items referred typically by trade name or part number.

Customer expertise and responsibility: The systems and methods make the customer fully responsible for (a) providing the data and (b) verifying the accuracy of the data, and all aspects of the data, on the basis of which the parts are costed and possibly produced.

Customer tools and access: The systems and methods provide the customer either with direct access to the quotation system for operation or all the tools required to produce an MTO file which is then submitted.

Detailed or undetailed quotations serviced: The systems and methods accept an MTO file that is either adequate for quotation or alternatively complete and accurate for production. It is not the responsibility of a service center to ascertain the completeness or accuracy of the data supplied.

Detailed or undetailed quotations a customer responsibility: It is the sole responsibility of the prospective customer to prepare the information and to decide if the information is complete and accurate.

A Trading system: The systems and methods send a single MTO file to a network of Quote Engines or quotation machines hosted by suppliers for competitive quotation where the prospective customer receives a number of quotations.

A System available at all hours: The systems and methods operate completely automatically and unattended where intervention by staff of the metal service center is not required and which can provides accurate and complete quotes 24/7 within minutes The concept that a single file in a single format may be used for both estimation and production. This is entirely new. For the purpose of either quotation or production, it is not an issue for the Service Center to decide whether the MTO is complete, accurate, fully detailed. That is entirely the responsibility of the customer.

Key Features Include

Using a single file (e.g., MTO file 330, FIG. 3) to encapsulate all the components of an assembly, whether a single BBQ plate, a 20 story building, a ship, or a tractor. The single MTO file is not just the list of components, but defines the components themselves. Prior to the systems and methods disclosed herein, a manual take-off (MTO) file was, in essence, a list of items that required additional individual files to describe each item.

This single file (e.g., MTO file 330) defining at least shapes and lengths is sufficient for precise estimation even when lacking ultimate detail such as weld preparation and/or precise hole location. A fully detailed MTO file may include much additional detail which does not, in essence, change the geometry but may add processes such as weld preparation, marked lines for pressing or forming, text for identification, drilled as opposed to cut holes, tapping of holes and the precise location and number of drilled holes, coping (or cutaway) of beams and miters. This as akin to the internet itself, where a single stream of information over a telephone line started as simple text and/or data, then evolved to include images, and now may be used for watching live television. Looking at the history of the Internet, it started as a way to transmit a single stream of data.

The matching idea is to implement a quotation engine that uses this single file (e.g., MTO file 330). The systems and methods include software that interprets the information in the single MTO file, and uses multiple optimization layout engines for true shape, rectangles, lengths, and mitered lengths to generate optimal cutting patterns to determine numbers for cut weight, remnant weight, scrap weight, and manufacturing costs and times that are essential for a quotation for supply.

The systems and methods disclosed herein develop the single file idea such that, with sufficient detail, this same file may explode its essential components to be a full specification for the precision manufacture and delivery of these components. So this single file, if fully detailed, may be used both for quotation and production. Or it may be used for quotation when detailed sufficiently, and then have detail added for production, but without changing the nature of the file except in finer detail.

A further development is that a number of such quotation engines distributed across an equal number of service centers could be used to provide simultaneous competitive and unattended quotation.

Steel Service Centers are a low skilled large warehouse for steel and aluminum. They are adding cutting machines as a service and these machines are very complex and capable of a high degree of automation, but it is beyond the skill level and training of the staff of the steel service center to handle the complexity and huge variety of the incoming information. One key idea is that the responsibility is flipped around to use the skills of the expert customers, who as engineers know exactly what they want and what has to be done to supply this information. By providing these engineers with all the tools needed to create the single MTO file in detail, the single MTO file becomes the traded commodity. For example, the tools which allow the creation of the single MTO file include the FastCAM® drawing editor for flat parts and weld preparation, FastSHAPES® for formed plate, FastBEAM™ for extruded long product from I beams to RHS to channel and including coping and mitering, FastPIPE™ for round products from simple reticulation to structures as with FastFRAME® and inside the MTO file you have the CAM format and the FBV (FastBEAM Variable) formats. A critical development was the program MTO.exe which creates the MTO file itself by reading of many formats into one file as elements of the structure along with all the quantities, specifications of material and job detail. It also allows the explosion of this file into individual files and lists sufficient for production. Thus, the systems and methods disclosed herein empower the skilled engineering customers to create the single MTO file and thereby eliminate any need for the Service Centre to change anything. In effect, the customers specify precisely what is done to the metal and thus what will be delivered on the truck. It is likely that popular design systems such as Tekla for designing structures may directly output a single MTO file instead of a huge number of individual files such as individual German DSTV files. Other tools that currently output.DXF files (another de facto standard since 1983) may also evolve to output a single MTO file. As the world moves from CAD (Drafting) to CAD (Design), the single MTO file may not only encapsulate entire structures for the purpose of fabrication, but may also become the tradeable job file for estimation and production.

Figure 16:
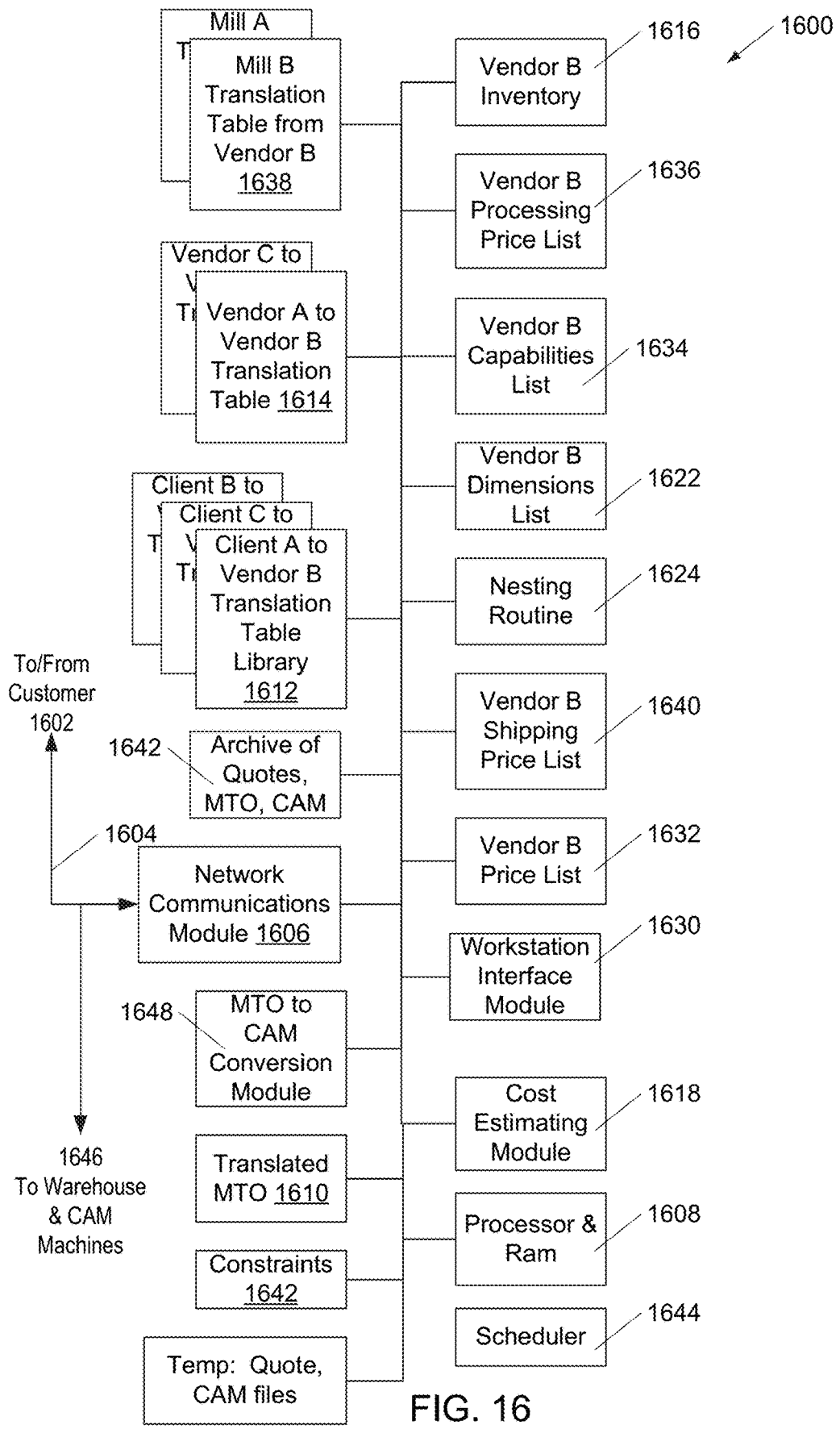
FIG. 16 is a block diagram of an embodiment of a quotation machine for use in a steel or aluminum service center.
Figure 17:
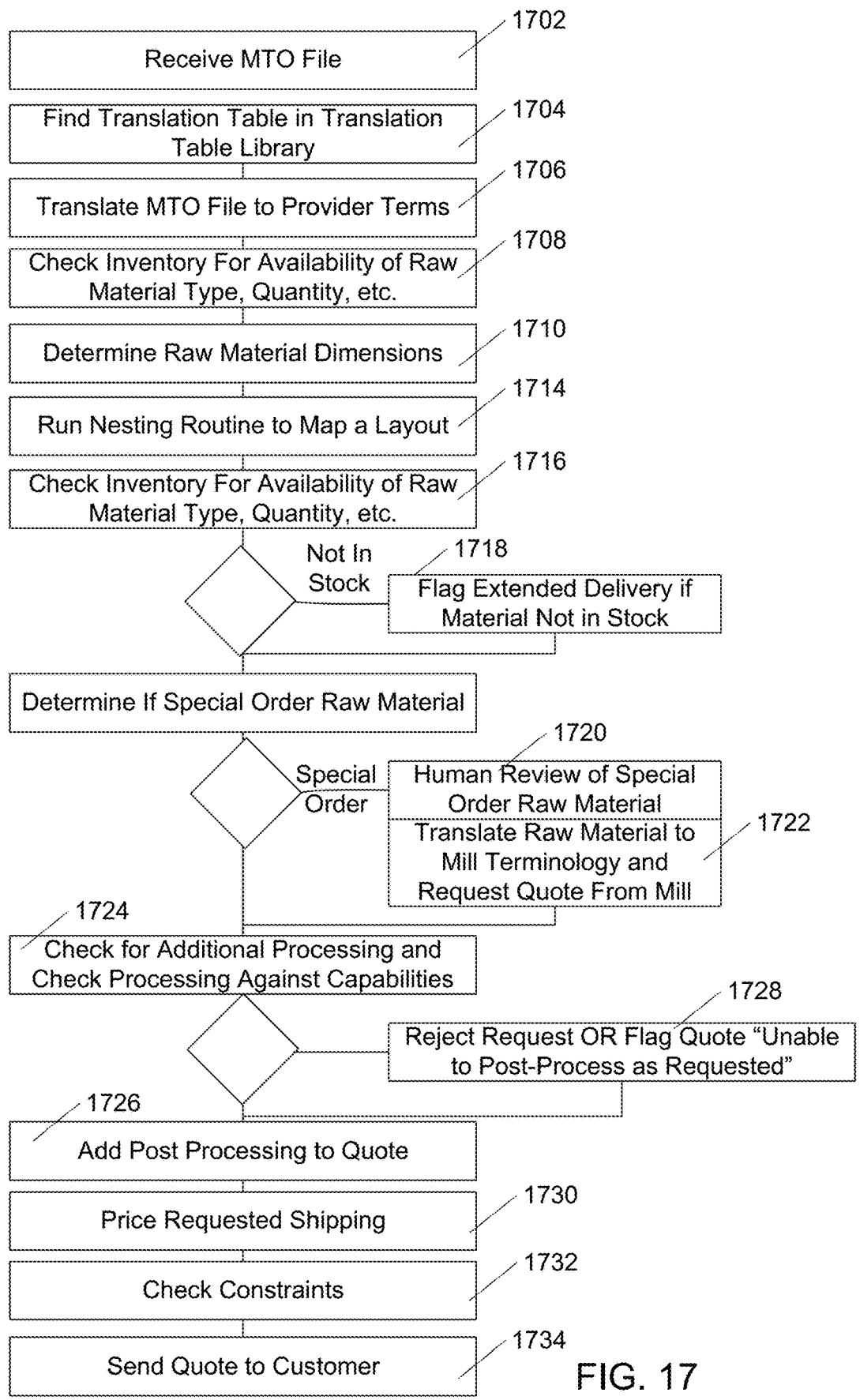
FIG. 17 is a flowchart of actions taken by the quotation machine of FIG. 16 when a customer desires a quotation and/or desires to submit an order for non-existing steel parts.

With reference to FIGS. 16 and 17, when a quotation engine or quotation machine 1600 receives 1702 a request-for-quotation with an MTO file from a customer 1602 over a computer network which may in an embodiment be the internet 1604 into communications module 1606, a processor 1608 of the machine acknowledges receipt of the MTO file from the customer and begins processing the MTO file.

As a result of tradition, the steel industry has numerous terms used to describe particular steel alloys and raw stock, including rolled, cast, and extruded shapes as produced by a mill, Steel service centers in the same state or country that buy raw stock from the same mill and who generally speak the same language will often have different names for the same raw stock. Further, large customers may also have yet-different names for the raw stock than those used by the steel service center. Some of these names may even be used for several different materials at the same service center, for example in a particular Australian service center there are three different raw stock materials known as "360UB" weighing from 44.7 to 56.2 kg/m, this duplication adds to confusion, need for translation, and may require a supplemental term such as "heavy" or "light" to unambiguously specify a stock material.

While some steel service centers prefer this confusion, because it tends to lock in customers, the result can be costly and impedes competition.

The plethora of different names for raw materials requires processor 1608 of quotation machine 1600 find an appropriate translation table in a translation table library 1612. In an embodiment, this translation table is located through a translation table identifier in the MTO file; in another embodiment this translation table is located through a customer identifier in the MTO file. In some embodiments, particularly those usable with metal-trading websites as in FIG. 15 or for generation of quotes using MTO files originally prepared for use with another vendor, the translation table is located in a library of vendor-to-vendor translation tables 1614.

In an alternative embodiment, the quotation machine's 1600's processor locates all keywords in the MTO file that may require translation and searches for a translation table in customer or vendor-vendor translation table libraries 1612, 1614 that contains translations for all terms in the file, in this embodiment the quotation machine adds a warning to the quotation requesting the customer confirm that reliance on these translations during quotation was reasonable.

Once an appropriate translation table is located in translation table library 1612, the processor 1608 translates 1706 terms of the MTO file into a translated MTO file 1610 using terms used at the current steel service center or vendor "vendor B."

Some terms in the translated MTO file specify a raw material. Once translation is done, processor 1608 of the quotation machine looks up 1708 the raw material in inventory 1616 to see if this material is in stock and determine quantities available and unreserved for committed projects, and whether this material is regularly available from mills or is a special order item.

Physical dimensions of the raw material are determined 1710 from dimensions list 1622, physical dimensions and quantities of the non-existing steel parts are drawn from the MTO file, and nesting routine 1624 is executed 1714 to determine a possible layout of the parts on the raw material required to fulfil an order should the quote being prepared become a firm order from the customer; this layout is used to determine 1716 scrap, remnant, and quantities of material.

If sufficient quantities of the material are available in inventory, as determined from inventory 1616 by the quotation machine, or if the material is readily available from mills, execution of the cost estimation module 1618 continues however, should the material not be in stock, a note is added 1718 to quotes warning of extended delivery times required for raw material to be received from a mill.

If the material is flagged as a special-order item, in some embodiments the quotation machine uses workstation interface 1630 is used to display the customer name, material identification, quantities needed, and ask a human 1720 operator if this quotation should be further processed or the request for quote be denied. If the quotation is continued and the operator so instructs, the raw material name is translated to mill terminology using a mill terminology translation table in a mill terminology translation table library 1638.

Next, the raw material is looked up 1722 in price list 1632 to determine a price for that portion of the parts; cutting charges are added to the raw material costs.

Many steel parts receive additional processing, such as hole drilling, paint or ink marking, and weld preparation. In future, some service centers may offer bending, welding, heat-treating, or other metal-forming services to assist customers toward finished products. The MTO file is checked 1724 for instructions for any additional processing requested and the requested additional processing is checked against a list of capabilities 1634 of the service center; if all additional processing requested is within center capability associated prices are found in a processing price list 1636 and added 1726 to the quote. If the post-processing is not within service center capabilities, the quotation machine either denies the quotation request or flags the quote 1728 with a message stating that the quotation does not include the desired post-processing—allowing the customer to decide whether to do accept a different quotation or have this this processing done elsewhere.

Next, any requested shipping is priced using a shipping-cost price list 1640, and added to the quotation.

The quotation prepared is checked 1732 against constraints in a constraint file, such as but not limited to limitations on minimum order size, maximum order size without human review, delivery schedules limits, and customers on credit hold. If all is well, the quotation is sent by email to the customer and saved in an archive 1642.

Figure 18:
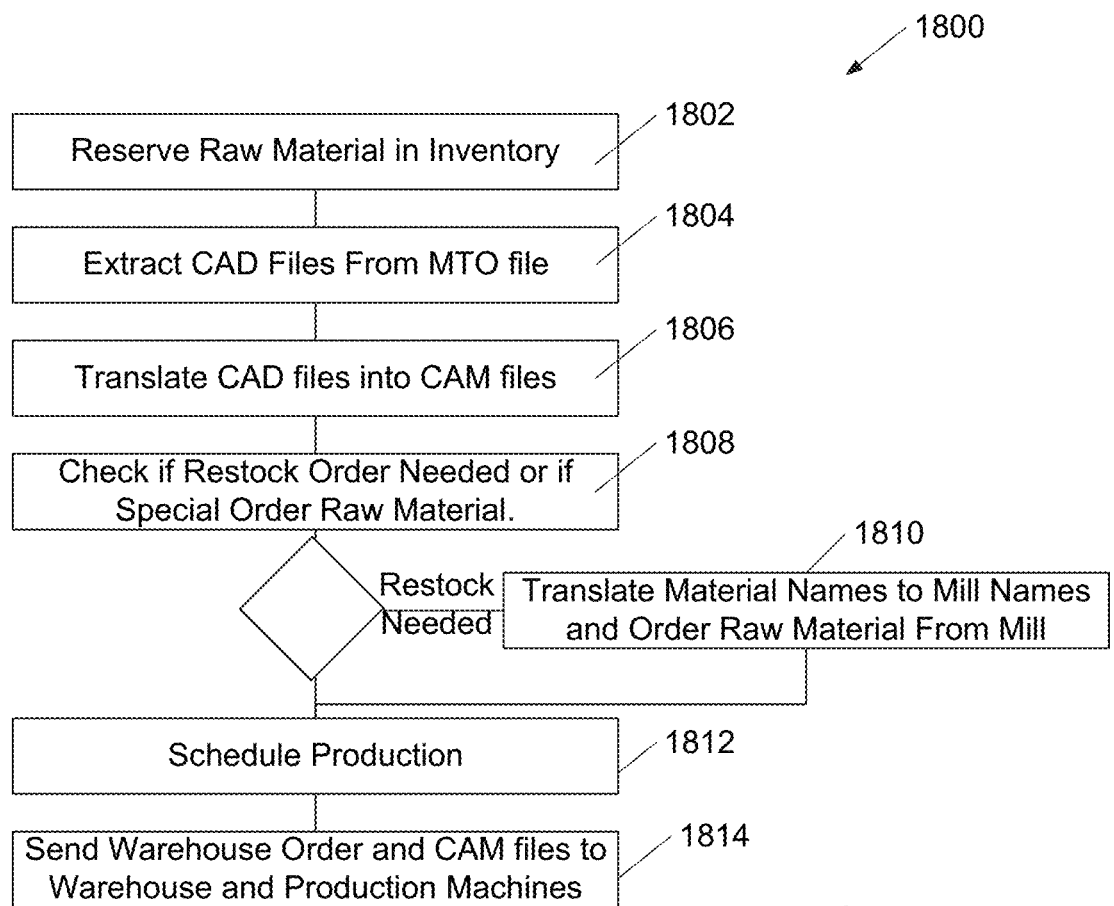
FIG. 18 is a flowchart continuing the flowchart of FIG. 17 for actions taken when the MTO file is a complete MTO file and the buyer has authorized production.

In the event that the MTO file is a complete MTO file with embedded CAD drawings of the non-existing steel parts, and the MTO file is flagged as an order and not a mere request for quote, the quotation is flagged as an order acknowledgement before sending to the customer. In this event, the quotation machine performs additional steps 1800 (FIG. 18), including marking 1802 the raw material as reserved in inventory 1616 and uses the results of the nesting routine 1624 and the machine's MTO to CAM conversion module 1648 to extract 1804 the CAD drawings and use them with the nesting routine results to automatically generate 1806 CAM (computer-aided manufacturing) files suitable for controlling machines, such as plasma cutters or saws, that will be used to manufacture the non-existing parts.

The quotation machine 1600 also checks inventory to see if a restocking order is required, in which case the local vendor B names are translated to mill names for one or more mills and quotation requests are sent to the mills, followed by an order to the low bidding mill for reordering.

Further, the quotation machine 1600 generates warehouse orders for the raw material to be extracted from the warehouse in which inventory is stored, and saves both the CAM files and warehouse orders in an archive 1642 of quotes, MTO files, CAM files, and similar files. Next, the quotation machine schedules the appropriate manufacturing machines in scheduler 1644 and at the appropriate time sends the warehouse orders and CAM files to the warehouse and CAM machines 1646.

It should be noted that many of the above steps may be performed in alternate orders.

Combinations of Features

The features herein described may appear in various combinations in embodiments. Among combination anticipated are:

A quotation machine designated A has a network connection adapted to receive a manual take-off file (MTO) containing information describing non-preexisting metal parts, and to transmit a quotation for production of the non-preexisting metal parts; and is configured to extract at least an identification of a raw material, and a rough shape of the non-existent part or parts from the MTO file. The quotation machine is configured to determine if the identified raw material is in stock in a warehouse; and has a nesting routine adapted to determine a layout for the nonexisting part or parts on the raw material. It is further configured to determine cost of the raw material, and to estimate scrap from production of the non-existent part or parts, and to prepare the quotation including the cost of the raw material with allowance for the scrap and cost of cutting parts from the raw material.

A quotation machine designated AA including the quotation machine designated A further configured to extract a computer-aided design (CAD) file from the MTO file and produce a computer-aided manufacturing (CAM) file from, at least in part, the CAD file, the CAM file adapted for use on a metal-cutting machine to produce the non-existing metal parts, the quotation machine further configured to transmit the CAM file to the metal processing machine to configure the metal processing machine to make the non-existing metal parts.

A quotation machine designated AB including the quotation machine designated A or AA further including translation tables, the translation tables having provider names for metal alloys and raw material shapes indexed by customer names for the metal alloys and raw material shapes.

A system designated B for estimating cost and fulfilling an order for non-existing metal parts, including a computer server having a processor and memory storing machine readable instructions that are executed by the processor to implement: a customer interface for receiving a single Manual Take-Off (MTO) file from a customer; and a quote engine for processing the single MTO file to automatically generate:
  (a) at least one layout of the non-existing metal parts on a raw metal product based upon a design of the non-existing metal parts in the single MTO file,
  (b) a quote estimating the cost of fulfilling the order based upon the at least one layout, and
  (c) at least one manufacturing file based upon the at least one layout and a computer aided design (CAD) filed embedded in the single MTO file; and a metal processing machine adapted to use the at least one manufacturing file to produce the non-existing metal parts from the raw product, the at least one manufacturing file comprising a numerical control program to control the metal processing machine.

A system designated BA including the system designated B, the at least one layout file defining nesting of at least two of the non-existing metal parts on the raw metal product.

A method designated C for estimating cost of fulfilling an order for non-existing metal parts, including interacting, via a web site, with a customer to receive a request for quote containing a Manual Take-Off (MTO) file defining the non-existing steel parts, the MTO file configured to contain one or more Computer-Aided design (CAD) files; processing the MTO file to generate at least one layout based upon stock information of a raw metal product, the layout defining:
  (a) nesting of the non-existing steel parts on the raw metal product,
  (b) a cost of cutting the parts from the raw metal product,
  (c) a used portion of the raw metal product,
  (d) a waste portion of the raw metal product, and
  (e) a remaining usable portion of the raw metal product.
The method including generating a quote estimating the cost of fulfilling the order based upon the at least one layout; and sending the quote to the customer.

A method designated CA including the method designated C, the CAD files being selected from the group including: DXF and DWG files, numerically controlled (NC) machining files, DSTV files, KISS files, computer-aided manufacturing (CAM) files defining formed plate, CAM files defining weld preparation, FBV or DSTV files defining beam sections, and FPV files defining pipe profiles.

A method designated CB including the method designated C or CA, the MTO file defining, for each of the non-existing metal parts, a 3D shape of the part, a material for the part, a quantity of the part, and additional processing of the part.

A method designated CC including the method designated C, CA, or CB, the step of processing comprising utilizing a full shape nesting tool to position the non-existing parts on a raw metal product based upon processing information that defines cutting capabilities of a numerical control cutting machine used to cut the raw metal product.

A method designated CD including the method designated CC, the full shape nesting tool positioning the parts based upon weld preparations defined within the single MTO file for each of the non-existing parts.

A method designated CE including the method designated CC or CD, the full shape nesting tool positioning the parts based upon advanced capability of the numerical control cutting machine including edge starts.

A method designated CF including the method designated C, CA, CB, CC, CE, or CE further including generating computer-aided manufacturing files from the MTO file, and using those computer-aided manufacturing files with a computer-aided manufacturing machine to produce the non-existing parts.

A method designated E for estimating cost to fulfill an order for non-existing metal parts, including receiving a request for quote (RFQ) containing a single manual take-off (MTO) file from a customer; processing the single MTO file to determine the non-existing metal parts; allocating the non-existing metal parts to at least one metal processing machine; generating at least one layout of the non-existing metal parts on at least one raw product to determine raw product costs; determining processing cost for the at least one raw product by the at least one metal processing machine; determining remnant values of the at least one raw product; determining scrap for the at least one raw product; determining handling cost of the at least one raw product, the non-existing steel parts, the remnants, and the scrap; determining a shipping cost of the non-existing metal parts; determining the cost to fulfill the order by adding the costs and subtracting the remnant values; and sending a quote containing the cost to the customer in response to receiving the RFQ.

A method designated F of manufacturing and delivering to a customer previously non-existing metal parts including quoting the cost of manufacturing and delivering the non-existing metal parts by a method including receiving at a metals service center a request for quote (RFQ) containing a manual take-off (MTO) file, processing the MTO file to determine the non-existing metal parts, allocating the non-existing metal parts to at least one metal processing machine, generating at least one layout of the non-existing metal parts on at least one raw product to quantify raw product required to produce the non-existing metal parts and looking up the quantified raw product in a price list to determine raw product costs, determining processing cost for cutting the non-existing metal parts from the at least one raw product by the at least one metal processing machine, determining remnant values of remnant produced by cutting the non-existing meal parts from the at least one raw product, determining scrap produced by cutting the non-existing metal parts from the at least one raw product, determining a handling cost of the at least one raw product, the non-existing metal parts, the remnants, and the scrap, determining a shipping cost of the non-existing metal parts to the customer, determining the cost to fulfill the order by adding at least the processing cost, handling cost, and raw product cost and subtracting the remnant values, and sending a quote containing the cost in response to receiving the RFQ. The method also includes compiling at least one computer-aided manufacturing file adapted to be operable on the at least one metal processing machine from the MTO file; using the at least one metal processing machine and the at least one computer-aided manufacturing file to produce the metal parts; and shipping the produced metal parts to a customer.

A method designated FA including the method designated F and further including the customer transmitting the MTO file to a metal trader; and the metal trader transmitting the MTO file to the metals service center.

A method designated FB including the method designated F or FA further including machine-translating names of raw product from names used by the customer to names used by the metals service center.

A method designated G of manufacturing and delivering to a customer previously non-existing metal parts includes quoting the cost of manufacturing and delivering the non-existing metal parts by a method comprising: installing an application on a computer, preparing, in the application, a manual take-off (MTO) file, sending a request for quote (RFQ) containing the manual take-off (MTO) file to a plurality of suppliers, at each supplier, processing the single MTO file to determine the non-existing metal parts, and returning a quotation to the application, allocating the non-existing metal parts to at least one metal processing machine, generating at least one layout of the non-existing metal parts on at least one raw product to determine raw product costs, determining processing cost for the at least one raw product by the at least one metal processing machine, determining remnant values of the at least one raw product, determining scrap for the at least one raw product, determining handling cost of the at least one raw product, the non-existing metal parts, the remnants, and the scrap, determining a shipping cost of the non-existing metal parts to the customer, determining the cost to fulfill the order by adding the costs and subtracting the remnant values, and sending a quote containing the cost to the application in response to receiving the RFQ; compiling at least one computer-aided manufacturing file adapted to be operable on the at least one metal processing machine from the MTO file; using the at least one metal processing machine and the at least one computer-aided manufacturing file to produce the metal parts; and shipping the produced metal parts to a customer.

Changes may be made in the above methods and systems without departing from the scope hereof. It should thus be noted that the matter contained in the above description or shown in the accompanying drawings should be interpreted as illustrative and not in a limiting sense. The following claims are intended to cover all generic and specific features described herein, as well as all statements of the scope of the present method and system, which, as a matter of language, might be said to fall therebetween.

What is claimed is:

1. A method of manufacturing previously non-existing metal parts comprising:
    quoting the cost of manufacturing the non-existing metal parts to a customer by a method comprising:
        receiving at a metals service center a request for quote (RFQ) containing a single manual take-off (MTO) file,
        processing the single MTO file to determine the non-existing metal parts,
        allocating the non-existing metal parts to at least one metal processing machine,
        generating at least one layout of the non-existing metal parts on at least one raw product to quantify raw product required to produce the non-existing metal parts and looking up the quantified raw product in a price list to determine raw product costs,
        determining processing cost for cutting the non-existing metal parts from the at least one raw product by the at least one metal processing machine, determining remnant values of remnant produced by cutting the non-existing metal parts from the at least one raw product,
        determining scrap produced by cutting the non-existing metal parts from the at least one raw product,
        determining a handling cost of the at least one raw product, the non-existing metal parts, the remnants, and the scrap,
        determining the cost to fulfill the order by adding at least the processing cost, handling cost, and raw product cost and subtracting the remnant values, and sending a quote containing the cost in response to receiving the RFQ;
        when the quote is accepted by the customer, receiving a password and unlocking an encrypted detailed description of the non-existing metal parts contained in the MTO file;
        compiling at least one computer-aided manufacturing file adapted to be operable on the at least one metal processing machine from the encrypted detailed description of the non-existing metal parts contained in the MTO file; and
        using the at least one metal processing machine and the at least one computer-aided manufacturing file to produce the metal parts.

2. The method of claim 1 further comprising:
    the customer transmitting the MTO file to a metal trader; and
    the metal trader transmitting the MTO file to a metals service center.

3. The method of claim 2 further comprising machine-translating names of raw product from names used by the customer to names used by the metals service center.

4. A method of manufacturing previously nonexisting metal parts specified by a customer comprising:
    quoting the cost of manufacturing and delivering the non-existing metal parts by a method comprising:
    receiving, from the customer, a single manual take-off (MTO) file,
    processing the single MTO file to determine an estimated cost of the non-existing metal parts, and sending a quotation incorporating the estimated cost to the customer, the estimated cost determined by:
    allocating the non-existing metal parts to at least one metal processing machine,
    generating at least one layout of the non-existing metal parts on at least one raw product to determine raw product costs using an unencrypted rough description of the non-existing metal parts embedded in the MTO file,
    determining processing cost for the at least one raw product by the at least one metal processing machine, determining values of remnant useful in fabricating other metal parts, the remnant resulting from cutting the nonexisting metal parts from the at least one raw product, determining scrap resulting from cutting the nonexisting metal parts from the at least one raw product, determining handling cost of the at least one raw product, the non-existing metal parts, the remnant, and the scrap, determining the estimated cost to fulfill the order by adding at least the processing cost, raw product costs, scrap, and handling cost and subtracting the values of the remnant;

after sending the quote, unlocking an encrypted detailed description of the non-existing metal parts when the quote becomes a successful bid;

compiling at least one computer-aided manufacturing (CAM) file adapted to be operable on the at least one metal processing machine from the MTO file; and using the at least one metal processing machine and the at least one computer-aided manufacturing file to produce the metal parts.

5. The method of claim 4 further comprising machine-translating names of the raw product from names used by the customer to names used by each supplier.

\* \* \* \* \*